G. P. CARROLL.
REFRIGERATING MACHINE.
APPLICATION FILED APR. 1, 1908.

1,219,533.

Patented Mar. 20, 1917.
16 SHEETS—SHEET 1.

G. P. CARROLL.
REFRIGERATING MACHINE.
APPLICATION FILED APR. 1, 1908.

1,219,533.

Patented Mar. 20, 1917.
16 SHEETS—SHEET 2.

WITNESSES
A. W. Smith
E. S. Smith

INVENTOR
George P. Carroll

G. P. CARROLL.
REFRIGERATING MACHINE.
APPLICATION FILED APR. 1, 1908.
1,219,533.
Patented Mar. 20, 1917.
16 SHEETS—SHEET 3.
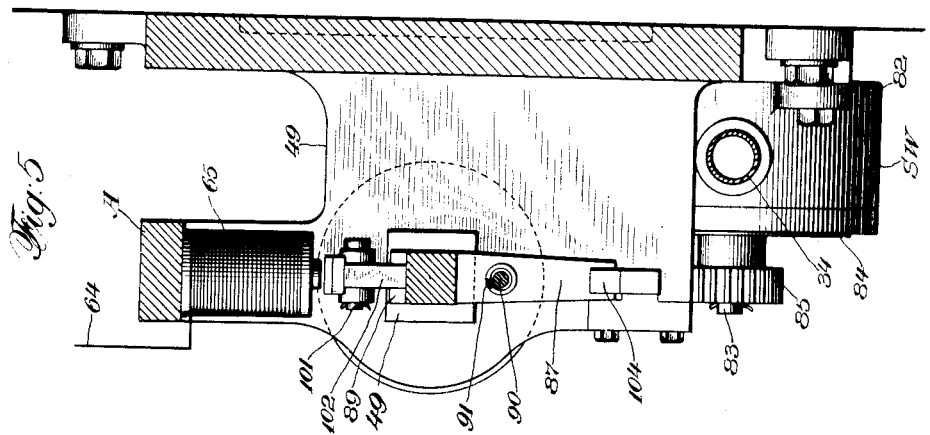
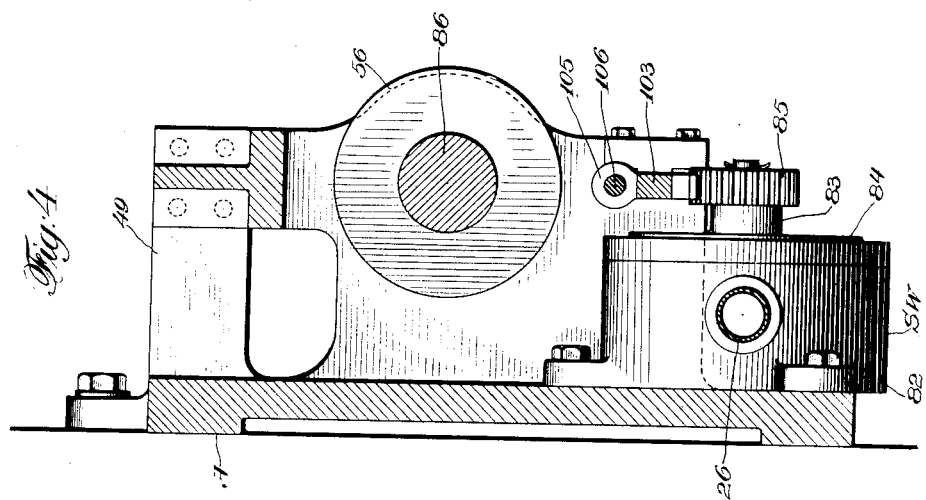
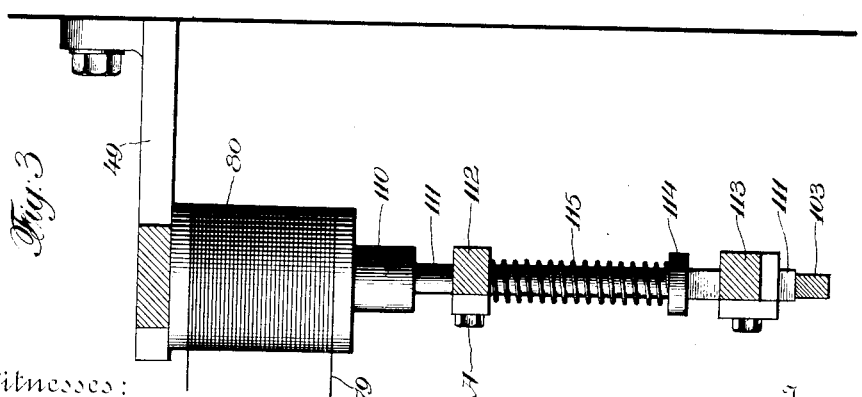
Witnesses:
A. W. Smith
E. S. Smith
Inventor
George P. Carroll

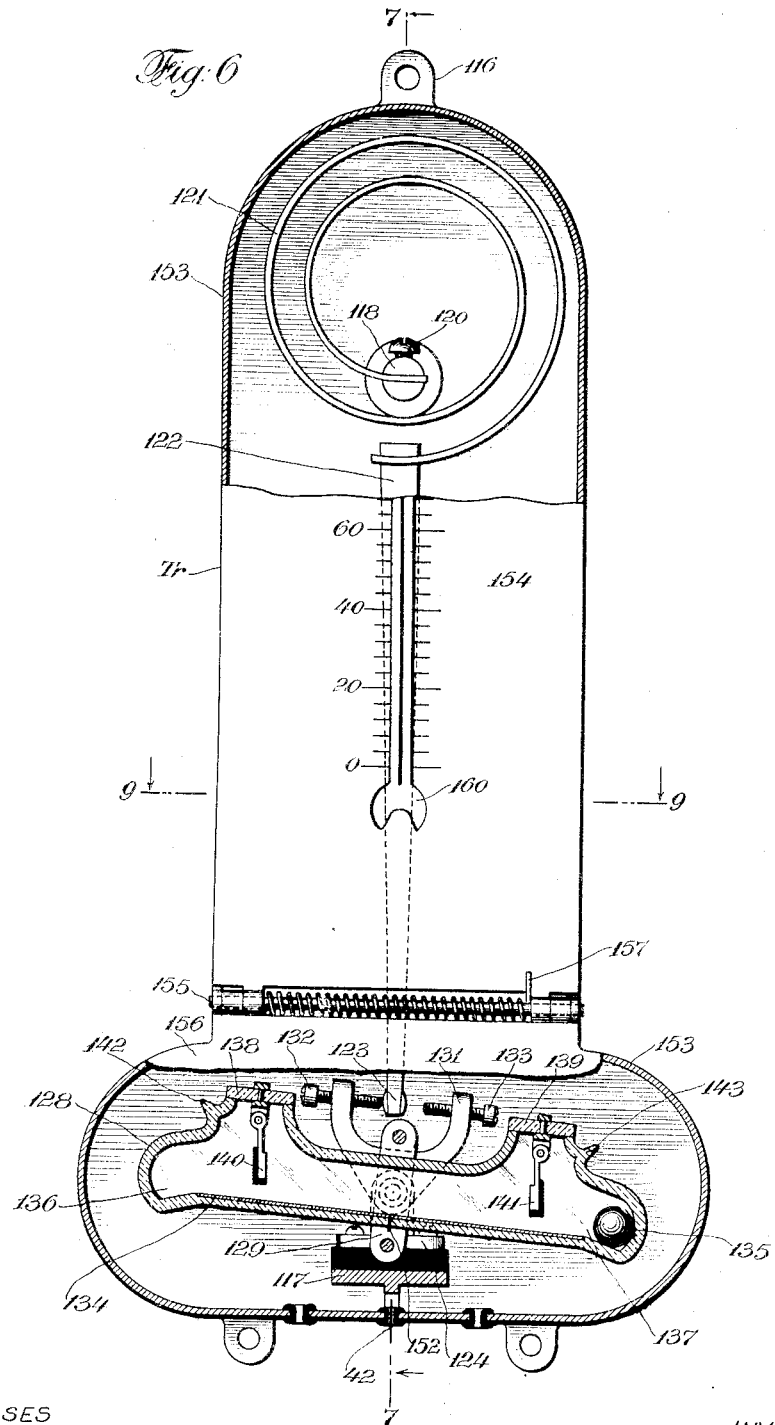

G. P. CARROLL.
REFRIGERATING MACHINE.
APPLICATION FILED APR. 1, 1908.
1,219,533.
Patented Mar. 20, 1917.
16 SHEETS—SHEET 5.
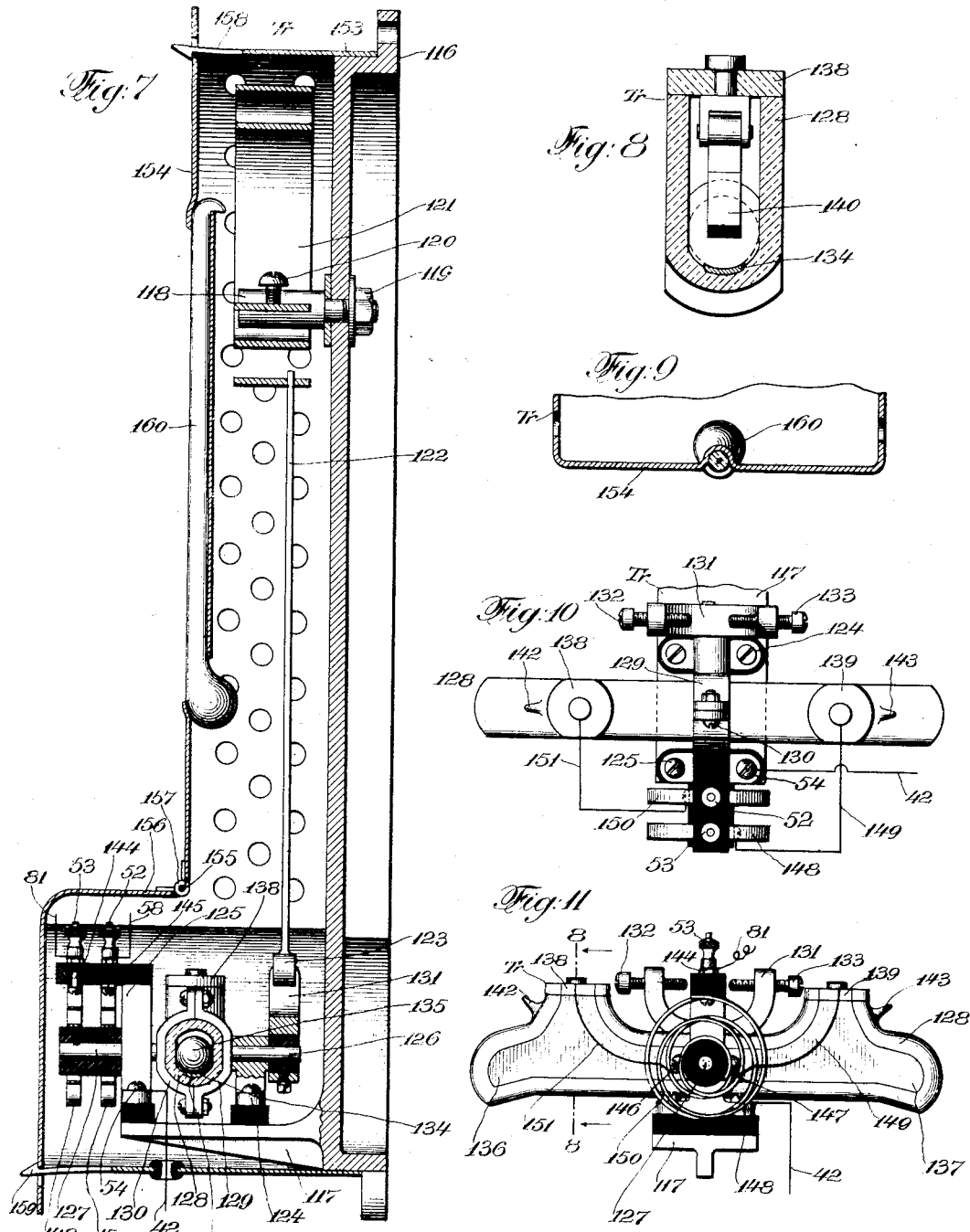
WITNESSES:
A. W. Smith
E. S. Smith
INVENTOR:
George P. Carroll

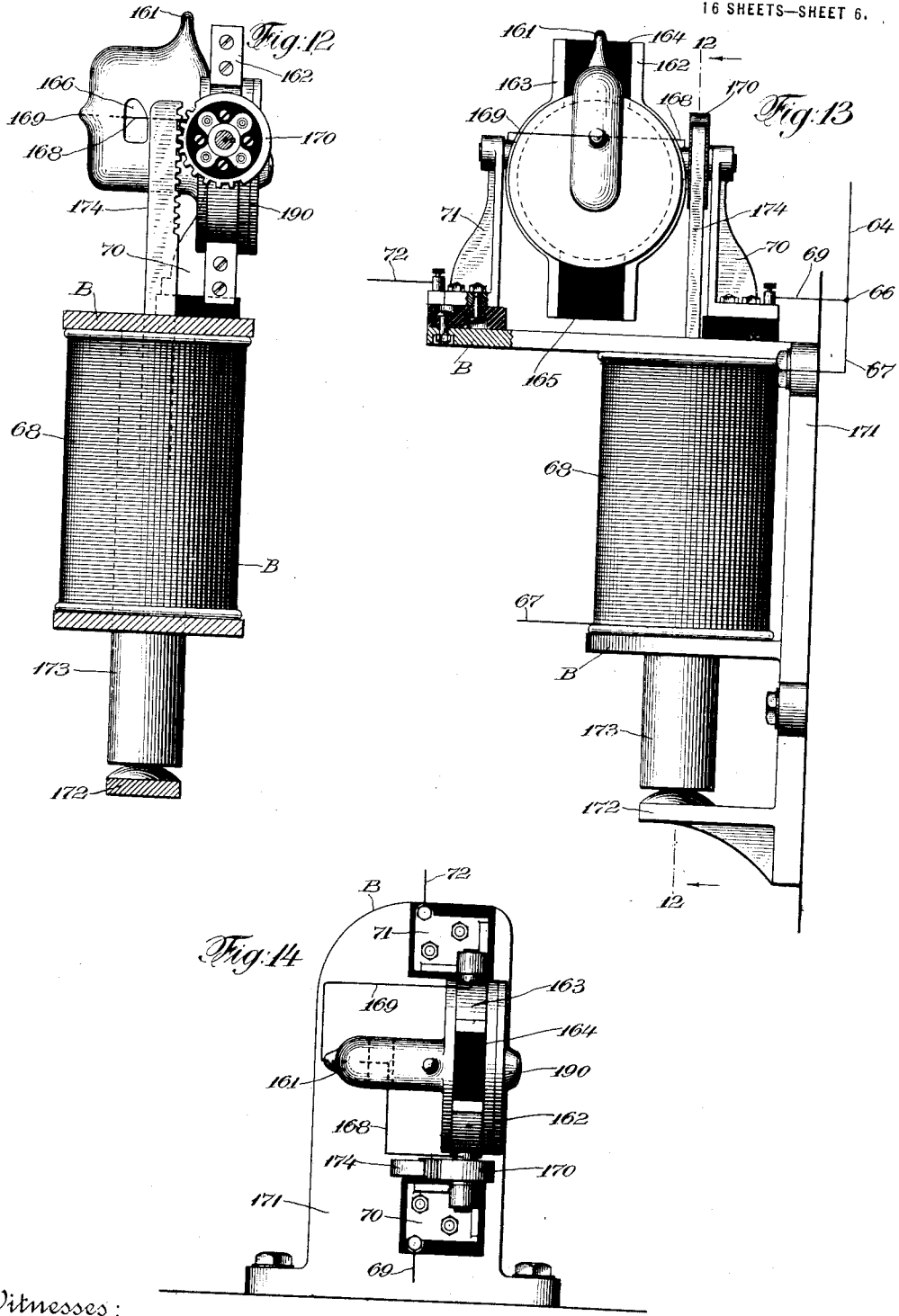

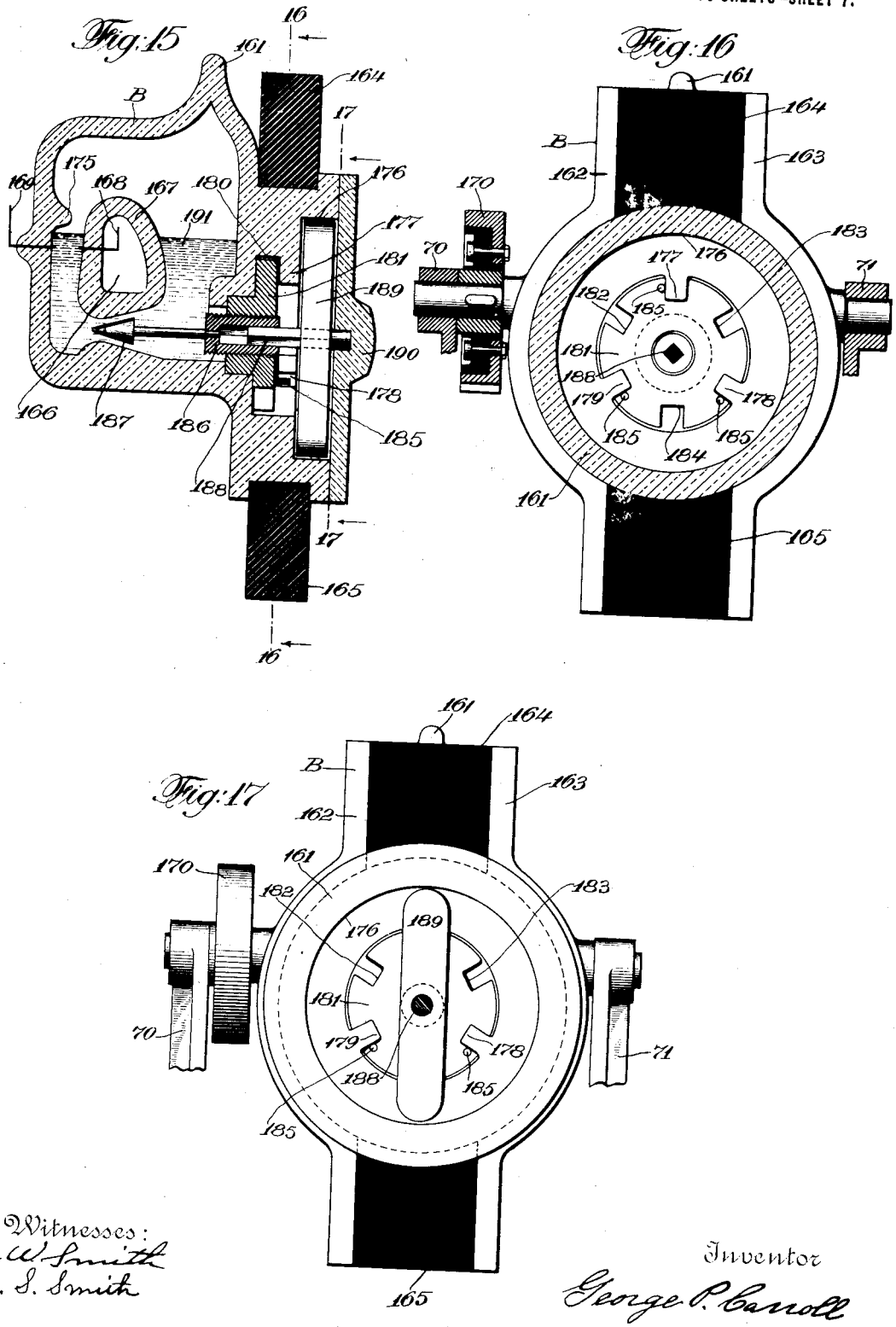

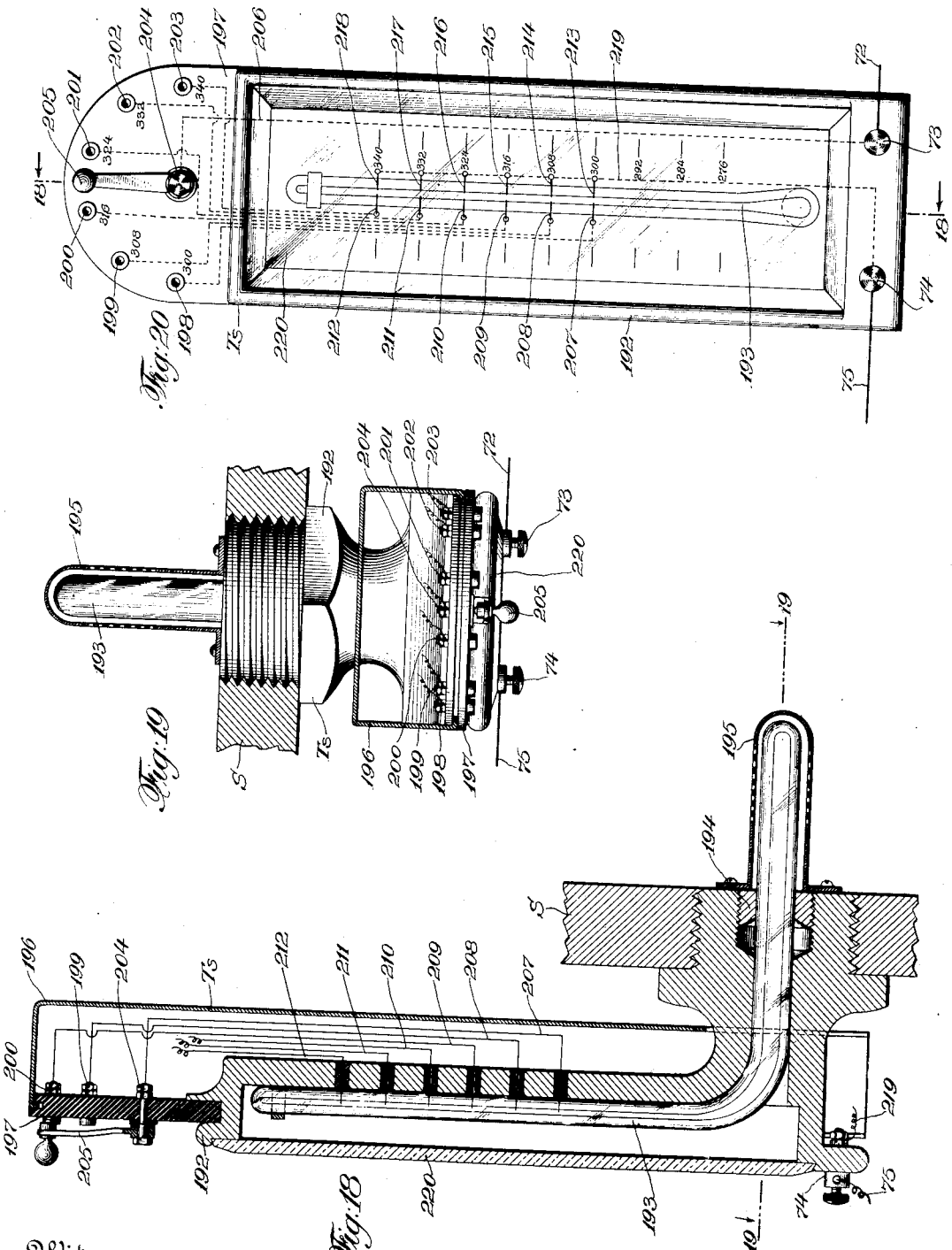

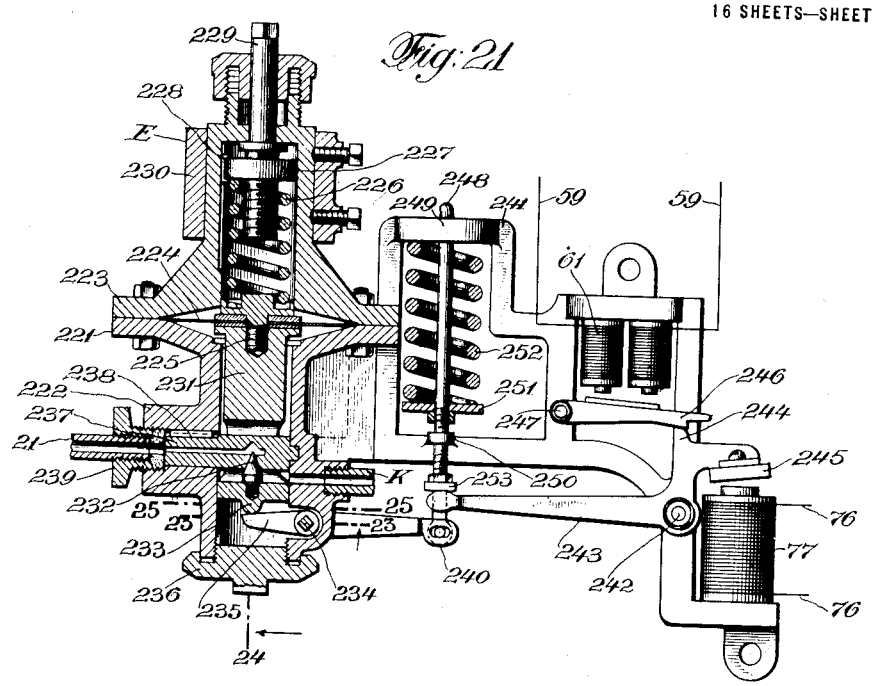
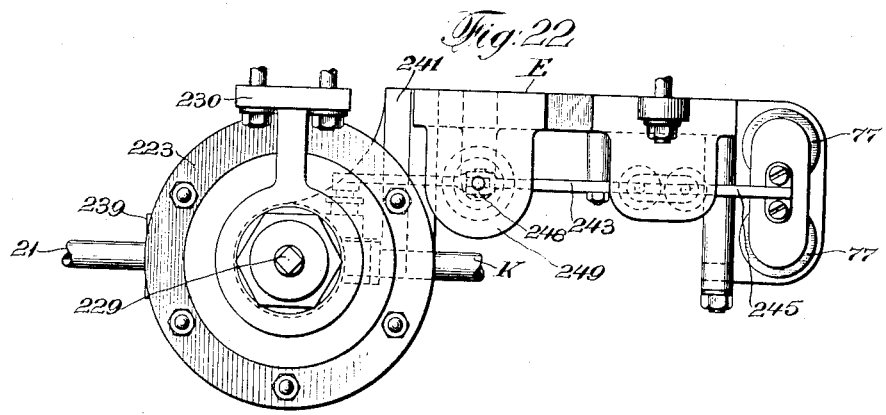
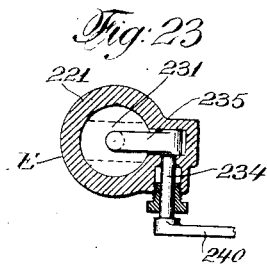
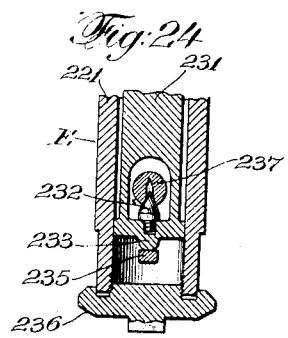
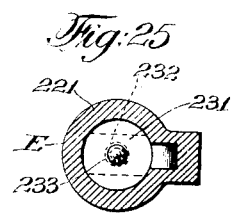

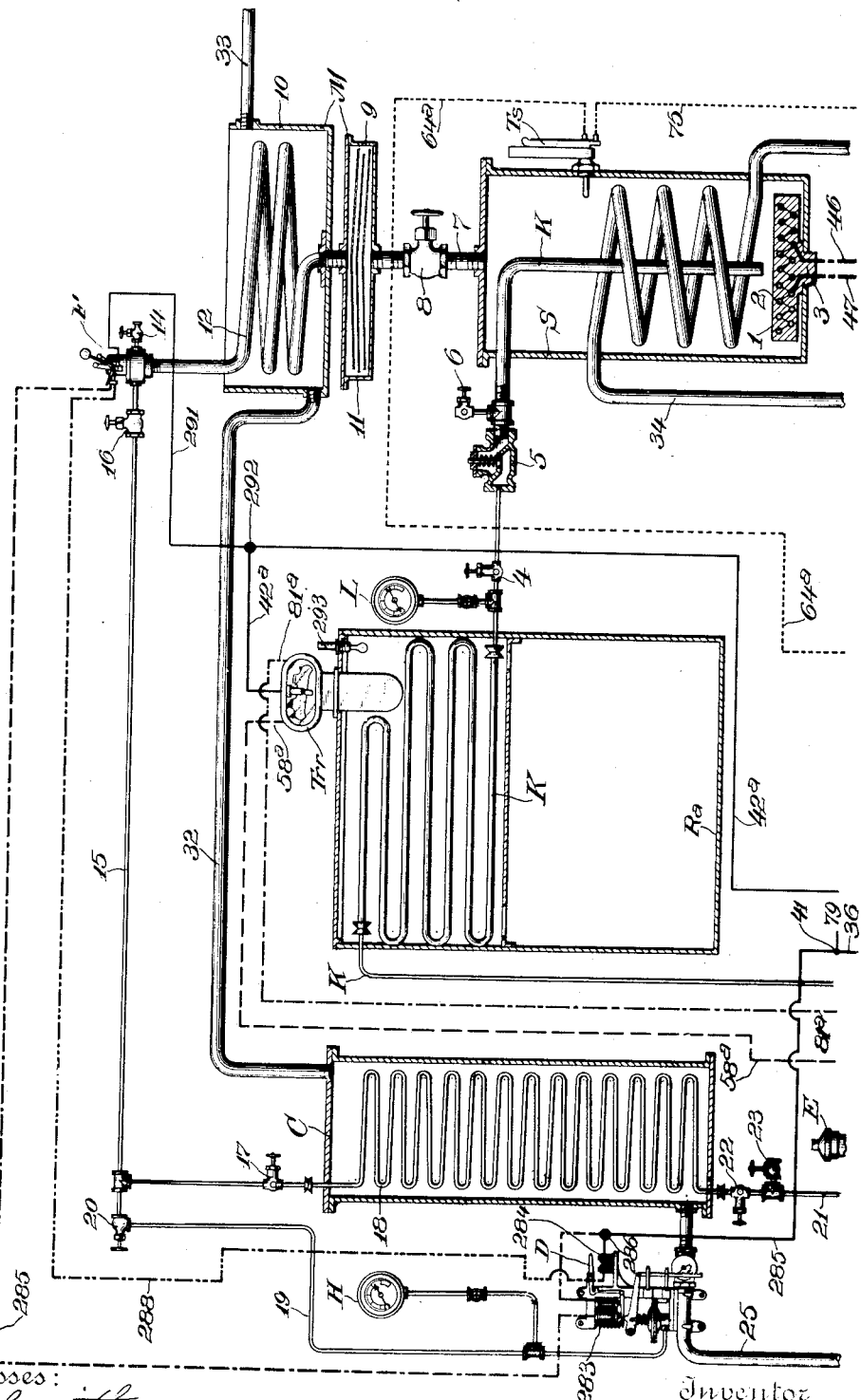

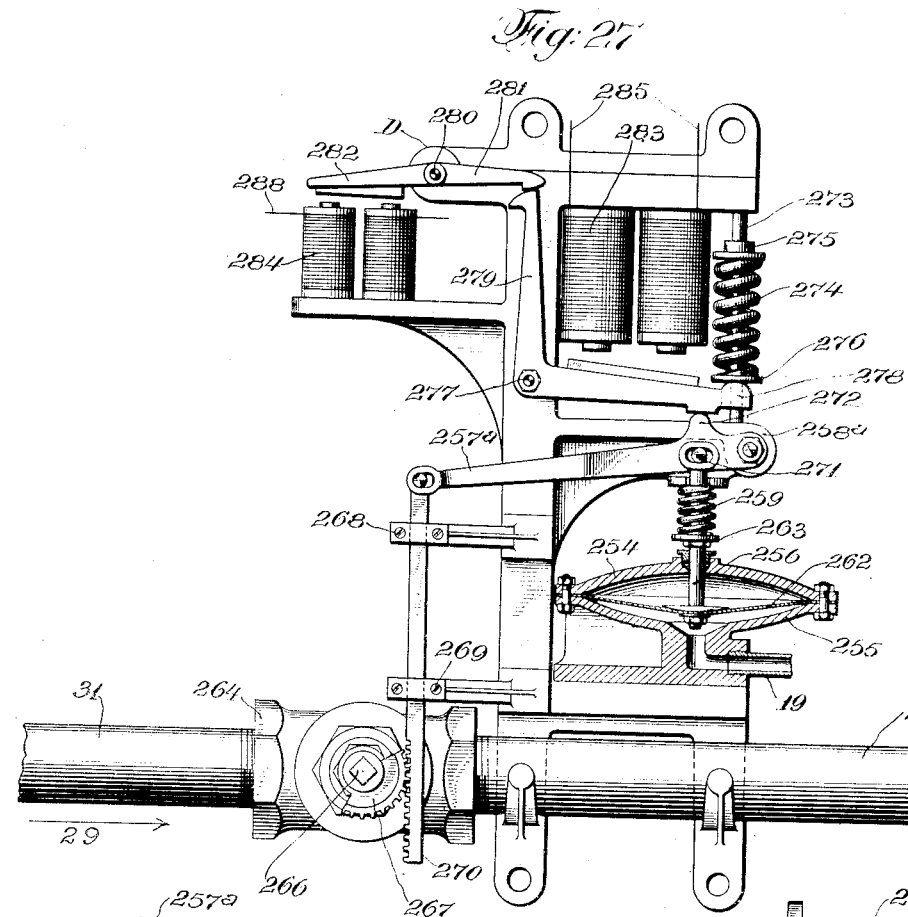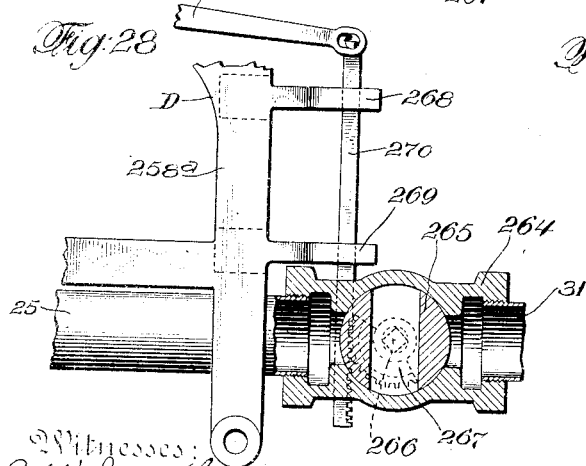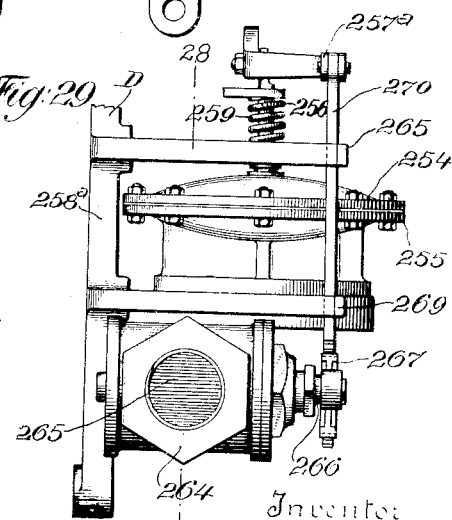

G. P. CARROLL.
REFRIGERATING MACHINE.
APPLICATION FILED APR. 1, 1908.

1,219,533.

Patented Mar. 20, 1917.
16 SHEETS—SHEET 12.

Witnesses:
A. W. Smith
E. S. Smith

Inventor
George P. Carroll

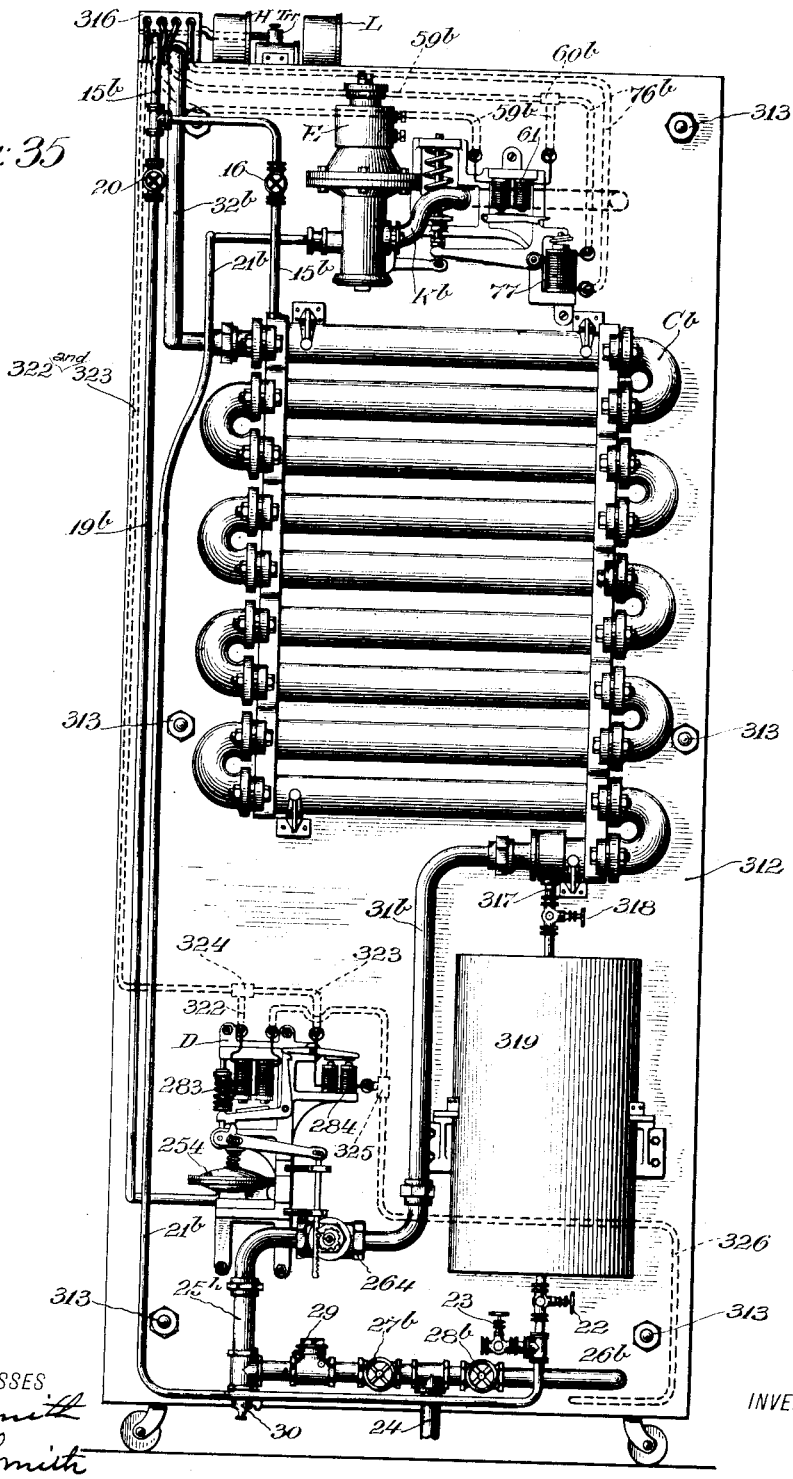

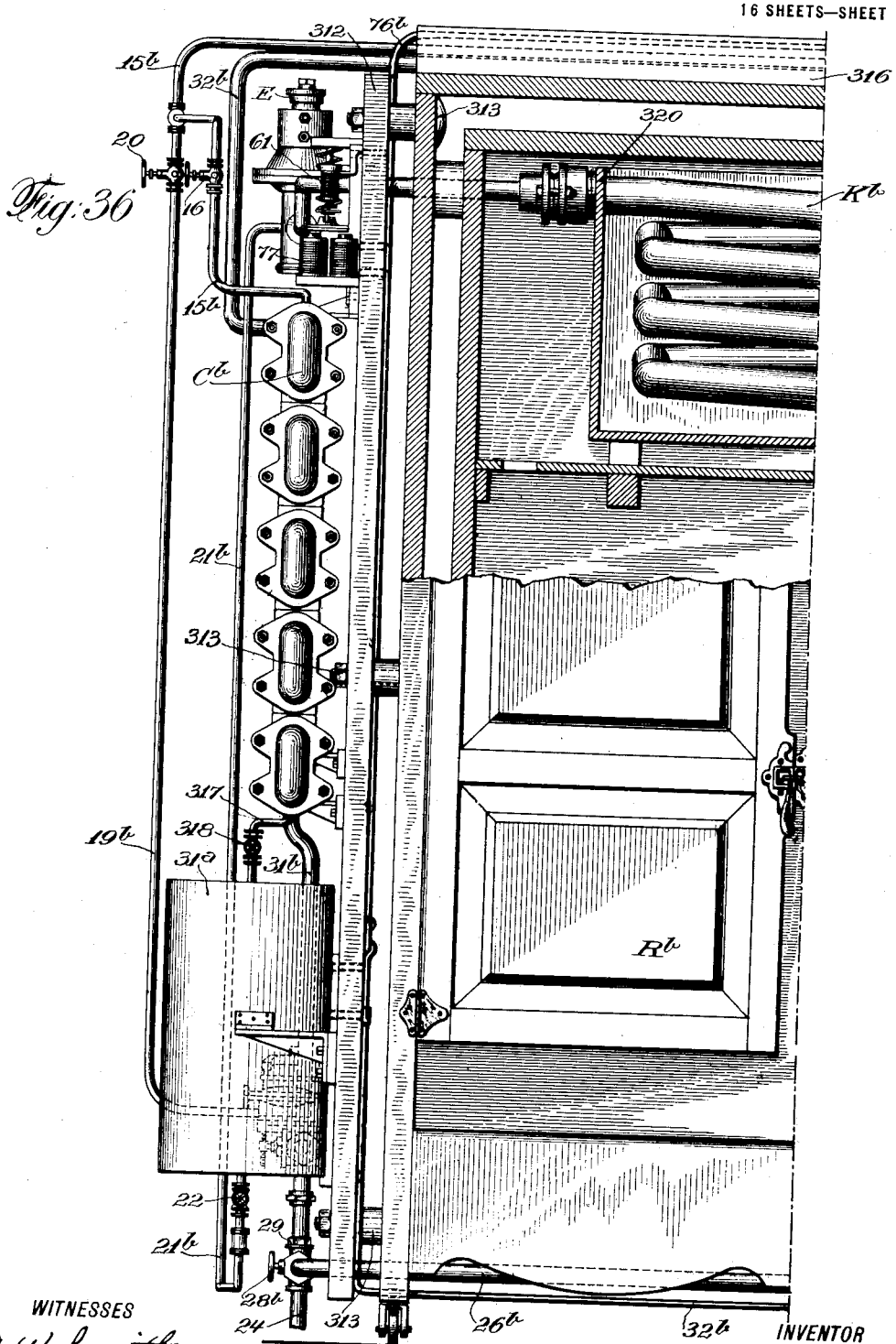

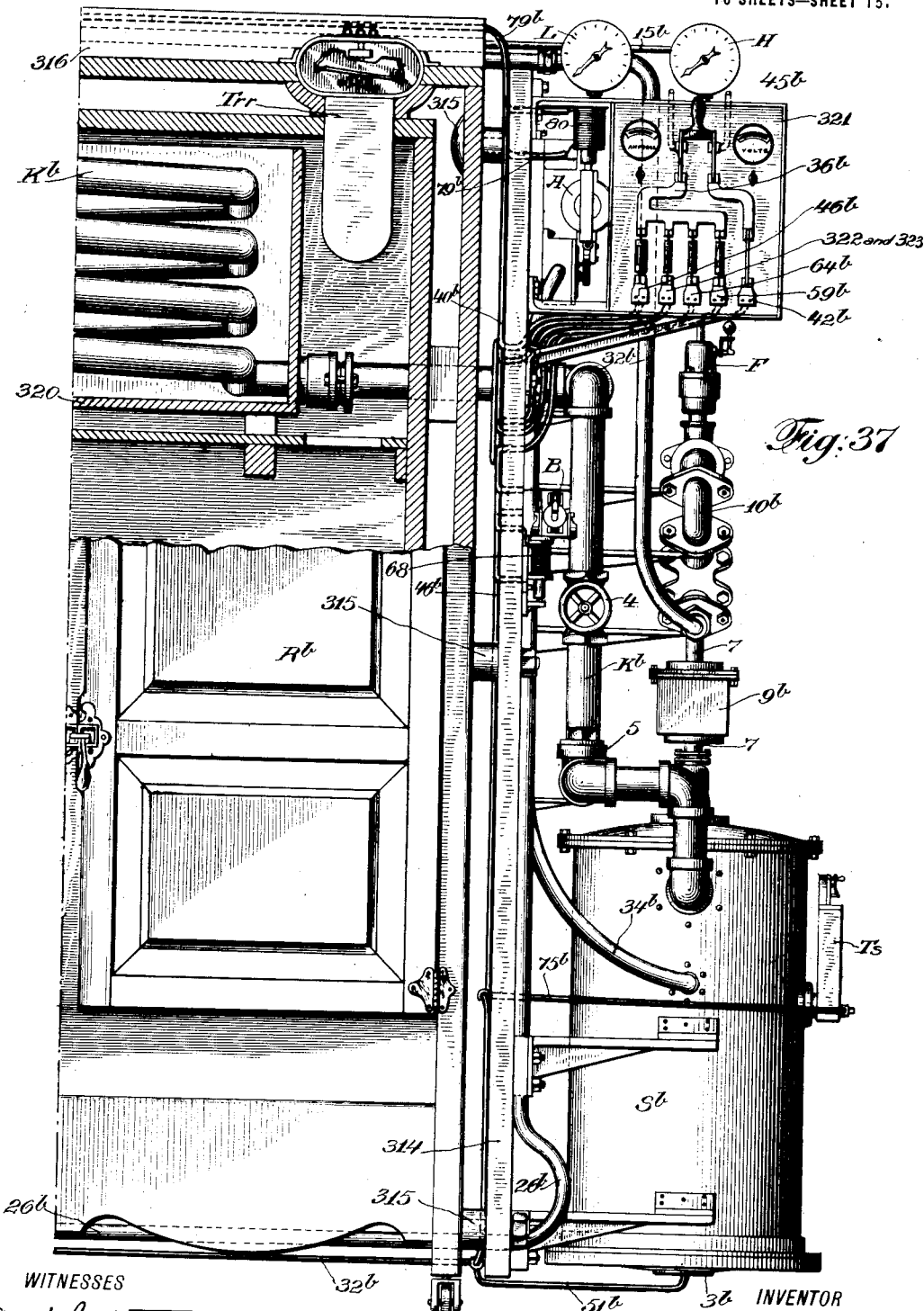

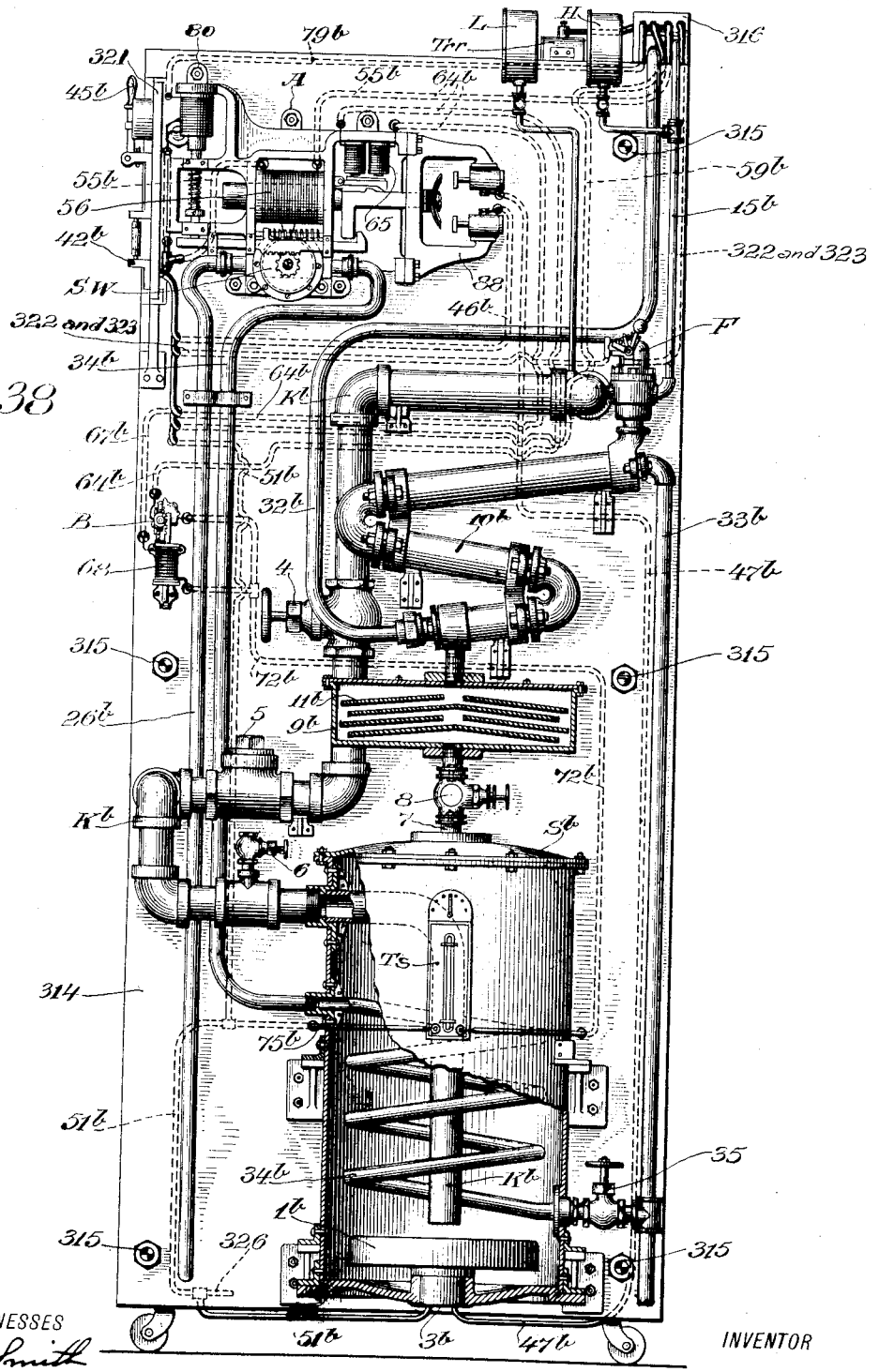

UNITED STATES PATENT OFFICE.

GEORGE P. CARROLL, OF BRIDGEPORT, CONNECTICUT.

REFRIGERATING-MACHINE.

1,219,533.  Specification of Letters Patent.  Patented Mar. 20, 1917.

Application filed April 1, 1908.  Serial No. 424,517.

*To all whom it may concern:*

Be it known that I, GEORGE P. CARROLL, a citizen of the United States, residing at Bridgeport, in the county of Fairfield and State of Connecticut, have invented a new and useful Refrigerating-Machine, of which the following is a specification.

My invention relates to improvements in refrigerating machines, especially of the intermittent absorption type, and is intended to so improve such machines that they will be automatic and economical of operation, especially when of small capacity and when used in connection with domestic refrigerators, soda water fountains and similar structures where refrigeration, with or without ice making, is desired and the attendance of an engineer is impracticable. The means employed for accomplishing these ends are disclosed in the accompanying drawings and in the description relating thereto. There are also certain detail improvements of construction as will also so appear. As in all refrigerating machines of the absorption type, the machine is constructed to contain and use one substance as a refrigerant and another substance as an absorbent of the refrigerant. While other materials may be used, I prefer to employ ammonia as the refrigerant and water as the absorbent; and, as these substances are most commonly used in absorption systems, they will be referred to in the description as typical of all.

Figure 1:
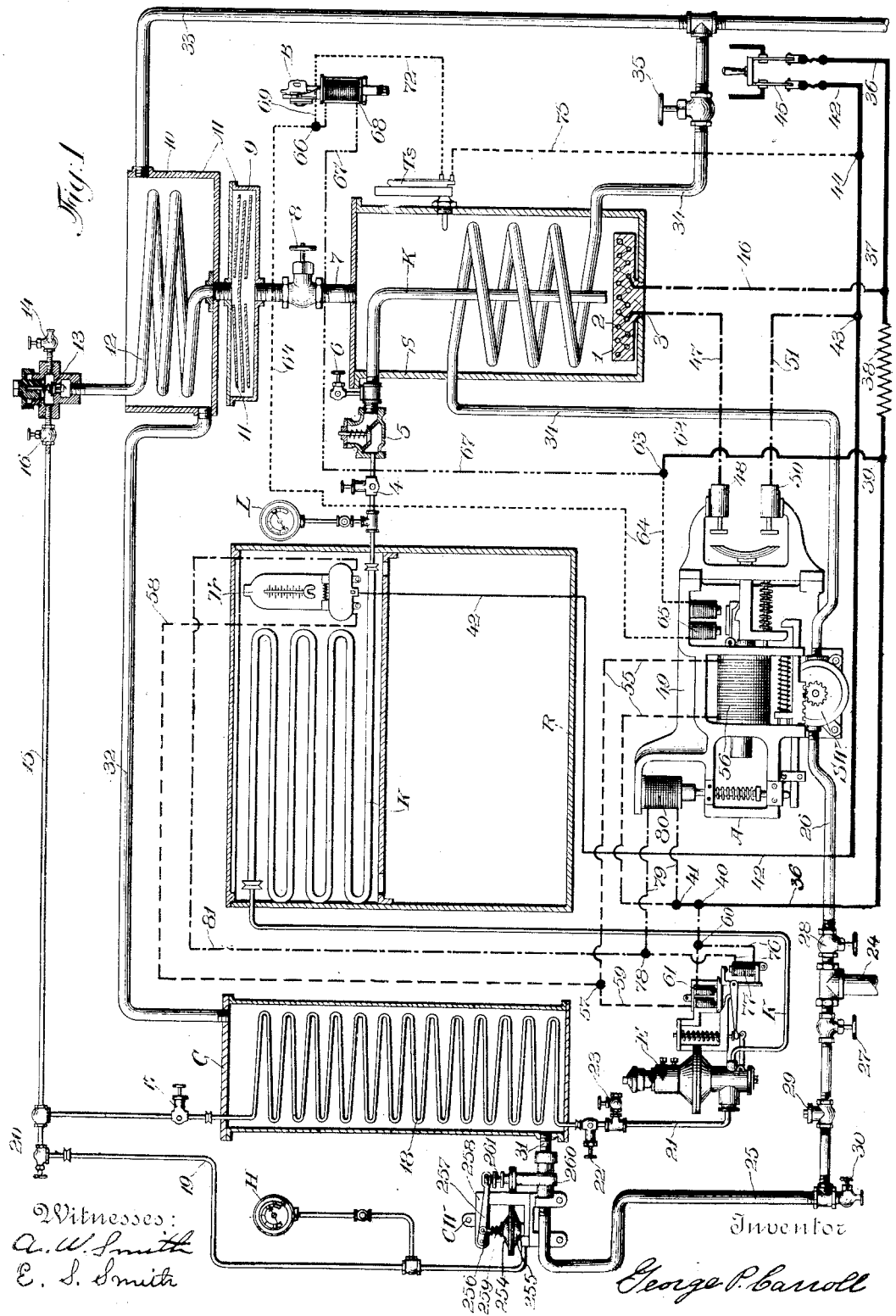
Figure 2:
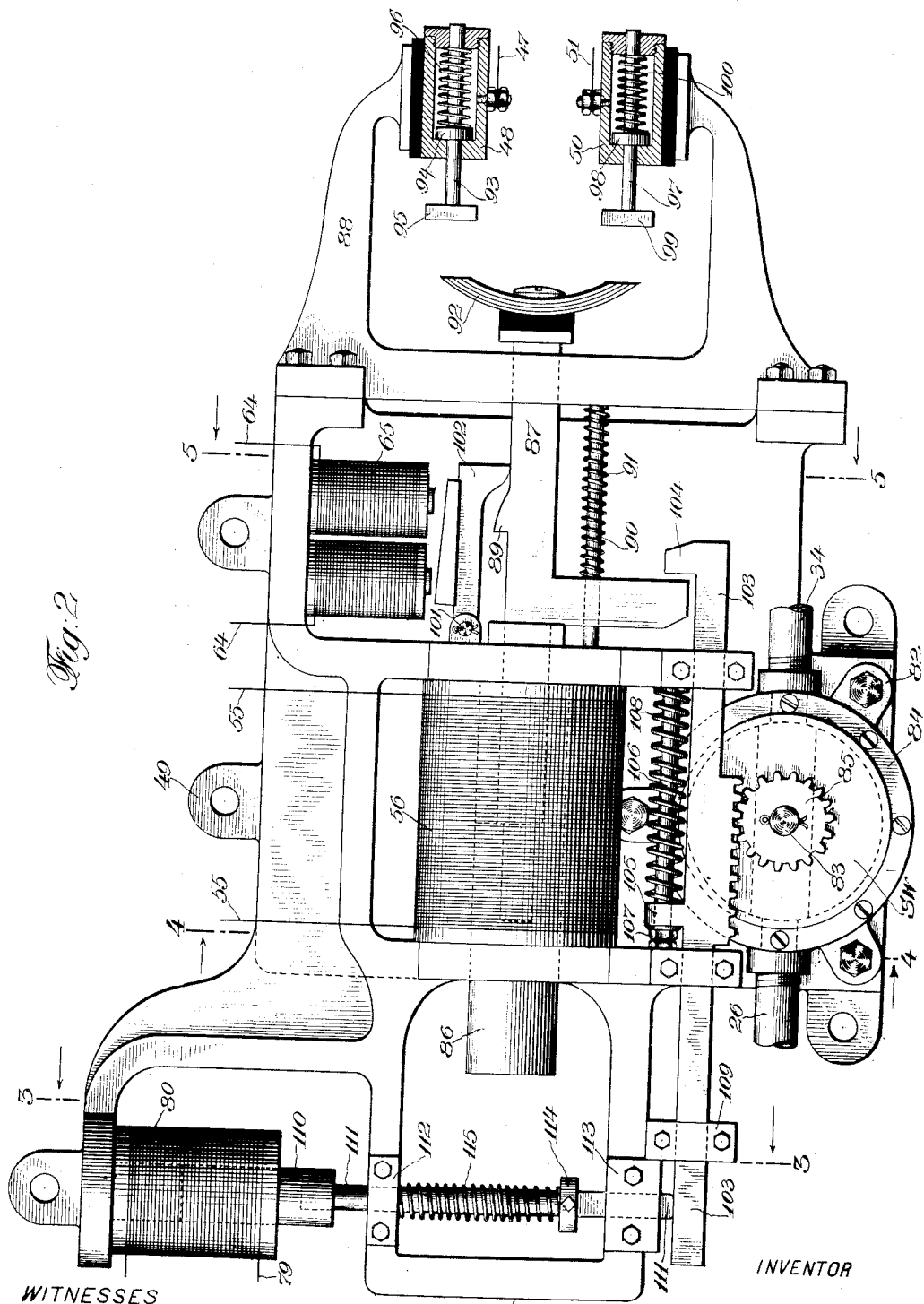
Figure 30:
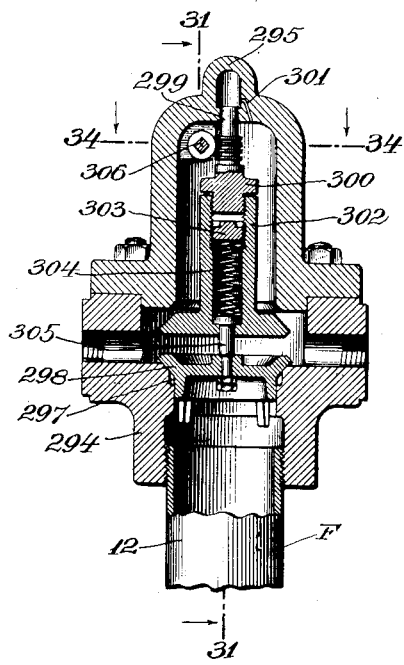
Figure 31:
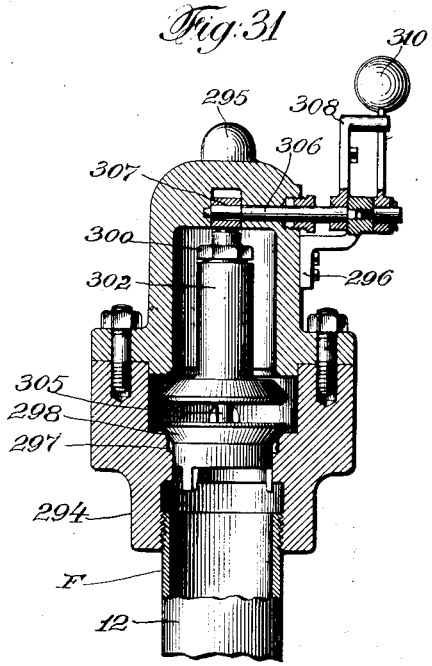
Figure 32:
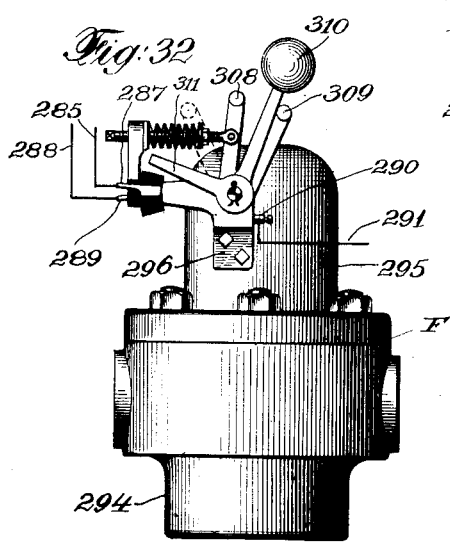
Figure 33:
Figure 34:
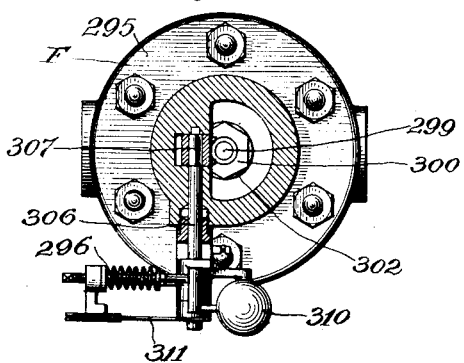

In the drawings Figure 1 is a diagrammatic view of one form of my invention showing the operative relations of the various parts. Fig. 2 is the front elevation of the main electric switch and still water valve therein. Fig. 3 a vertical section through the line 3—3 of the preceding figure looking toward the left. Fig. 4 is a vertical section through the line 4—4 of Fig. 2 looking toward the right. Fig. 5 is a vertical section through the line 5—5 of Fig. 2 looking toward the left. Fig. 6 is a partial front elevation and partial vertical section of a sparkless thermostat, especially adapted for controlling the temperature of a refrigerator. Fig. 7 is a vertical section through the line 7—7 of the preceding figure looking toward the left. Fig. 8 is an enlarged detail cross vertical section of the rocker shown at the bottom of Fig. 6 as seen through the line 8—8 of Fig. 11 looking toward the left. Fig. 9 is a horizontal broken section through the line 9—9 of Fig. 6 looking from above. Fig. 10 is a plan view and Fig. 11 is a front elevation of the rocker shown in Fig. 6 in vertical section. Fig. 12 is a partial elevation and a partial vertical section of an automatic circuit breaker through the line 12—12 of Fig. 13 looking toward the left. Fig. 13 is an elevation and Fig. 14 is a plan view of the circuit breaker of the preceding figure. Fig. 15 is a vertical section of the glass double casing shown in the upper part of Fig. 12. Fig. 16 is a vertical section through the line 16—16 of the preceding figure looking toward the left and from a point of view opposite to that of Fig. 13. Fig. 17 is a vertical section through the line 17—17 of Fig. 15 looking toward the left. Fig. 18 is a vertical section of an adjustable thermometer thermostat, especially adapted for cutting off the heat from a still, through the line 18—18 of Fig. 20 looking toward the left. Fig. 19 is a cross horizontal section through the line 19—19 of the preceding figure looking from above. Fig. 20 is a front elevation of the structure of the two preceding figures. Fig. 21 is a partial vertical section and a partial front elevation of a sensitive doubly actuated expansion valve. Fig. 22 is plan view of the structure of the preceding figure. Fig. 23 is a horizontal cross section through the line 23—23 of Fig. 21 looking upward and including a lever. Fig. 24 is a vertical section through the line 24—24 of Fig. 21 looking toward the left. Fig. 25 is a horizontal cross section through the line 25—25 of Fig. 21 a little above the line 23—23, looking upward and excluding said lever. Fig. 26 is an alternative construction of part of what is shown in Fig. 1. Fig. 27 is a partial front elevation and a partial vertical section of an alternative construction of an automatic condenser water valve. Fig. 28 is a partial back elevation and a partial vertical section of the same valve through the line 28—28 of Fig. 29 looking toward the right. Fig. 29 is an end elevation of the same valve as seen looking toward the right in Fig. 27, and with the moving parts in a lifted position. Fig. 30 is a vertical section of an alternative form of check valve for controlling said condenser water valve. Fig. 31 is in part a vertical section and in part an elevation of the same valve through the line 31—31 of the preceding figure looking toward the right. Fig. 32 is a front elevation of the same valve. Fig. 33 is an enlarged detail side elevation of the contacts seen in Fig. 32 as viewed from the left. Fig. 34 is horizontal section through the line 34—34 of Fig. 30 looking from above. Fig. 35 is a left side elevation of part of a preferred form of my invention attached to the left side of a small refrigerator. Fig. 36 is a front elevation of the structure of the preceding figure, including the machine, with a vertical half of the refrigerator, partially in vertical section. Fig. 37 is a partial front elevation and partial vertical section of the other half of the refrigerator and also a front elevation of the other part of the machine. Fig. 38 is a right side elevation of the structure of the preceding figure.

First considering Figs. 1 to 25 inclusive: The machine may be of indefinitely large capacity; but as it is especially intended for the refrigeration of small compartments, the drawings and description are made more appropriate to an ordinary domestic refrigerator. An expansion coil K is convoluted in the upper compartment of a refrigerator R and has its inlet and outlet ends project from opposite sides. It is arranged for a downward feed so that there is a decline from its entrance into the compartment all the way into a still, to be described. The coil may refrigerate the air directly or it may cool brine in a tank. The latter method permits of a longer shutting down between times of operation.

The outlet end of the coil emerges from the refrigerator, being provided with a low pressure gage L outside of the compartment, and leads into an upright cylindrical still casing S, which it traverses centrally and terminates a little above an electric heater 1. The high resistance wires 2 of the heater are doubly wound so as to be non-inductive. This construction makes it possible to use the heater with an alternating as well as with a direct current. The resistance wires are placed in a hollow disklike casing and the space between the wires and the thin walls of the casing is filled with an enamel such as is common for that purpose. The heater is placed in the lower part of the still casing; but it is surrounded on all sides by a free space for the aqua ammonia except where the wires leading to and from the resistance wires pass through a neck 3 inserted through the bottom wall of the still casing. It is to be understood that owing to the strong corrosive effect of ammonia, neither copper nor any of its alloys are to come in contact with ammonia whether anhydrous or in solution. In fact all the metal work with which the ammonia comes in contact should be of the same material; for with dissimilar metals, chemically generated electric currents set up, tending to a dissociation of the ammonia.

Just beyond the gage L is placed a stop valve 4 and just beyond the latter is placed a check valve 5, for preventing a back flow from the still casing. Between the check valve 5 and the still casing is placed a T, from which a short pipe proceeds upward into the outer air, provided with a charging valve 6. From the top of the still casing a short wide pipe 7, provided with a stop valve 8, leads upward into a moisture separator M, consisting of an analyzer 9 and a rectifier 10 immediately above the analyzer. The analyzer is an inclosed tank provided with any approved form of baffle plates 11 arranged transversely to the pathway of fluid passing upward through the analyzer so as to retard the impinging heated gas as it ascends, thereby separating from the gas the entrained moisture and allowing it to drain back into the still casing. From the analyzer, leading into the rectifier, is an ascending zigzag pipe 12, inclosed in the rectifier, which may in other details be a tank with its connections to be described. The parts 10 and 12, with the water inlet and outlet of the latter, are more commonly designated as a dehydrater.

From above the rectifier the pipe 12 leads into a check valve 13, for preventing a back flow of gas into the pipe. From one side of the check valve 13 a short pipe leads to the outer air and is provided with a purge valve 14; and from the other side of the check valve a pipe 15 passes above or back of the refrigerator R to a condenser tank C and is provided with a stop valve 16 near the check valve and a stop valve 17 near the condenser tank. The purge valve 14 is at the top of the gas pipe system. The condenser tank, of narrow diameter, contains a pipe 18, zigzagging downward. The lower part of the pipe 18 serves as a liquid ammonia container. A branch pipe 19, provided near its departure with a stop valve 20, leads from the pipe 15 between its valves 16 and 17, is connected with a high pressure gage H, and leads into an automatic condenser water valve CW, as will be described.

From the lower end of the pipe 18 a liquid pipe 21, which may be smaller, passes out of the condenser tank into a sensitive doubly actuated expansion valve E, as will be described. The expansion coil K leads from the other side of this valve. In practice the length of the coil between the valve E and the refrigerator is made as short as practicable. In the pipe 21 just outside the condenser tank is placed a stop valve 22. From just beyond the valve 22 and between it and the valve E a branch pipe leads into the outer air, in which is placed a vacuum valve 23.

From a source of cold water supply a pipe 24 leads into a T from which lead branch pipes 25 and 26 provided with hand valves 27 and 28 respectively on each side of the T. The pipe 25 is provided with a check valve 29 just beyond the valve 27, for preventing a back flow, and leads into the valve CW, as will be described. At the lowest part of the pipe 25 is placed a condenser drain valve 30 leading to the waste. From the other side of the valve CW a short pipe 31 leads to the bottom of the condenser tank; and from the closed top of the tank a pipe 32 leads to the bottom of the tank of the rectifier 10. From the top of this latter tank on the opposite side leads a pipe 33 to the waste. The pipe 26 leads to an automatic still water valve SW, as will be described. From the opposite side of the valve SW a pipe 34 leads into the side of the still S, say about two thirds up from the bottom, thence coils downwardly around the extremity of the coil K, passes out of the still near the bottom, and finally connects into the pipe 33. A hand controlling valve 35 is placed in the pipe 34 between the still and the pipe 33. The valve 35 is utilized for limiting the amount of water that may flow through the pipe 34 when the valve, to be described, at the inlet end of the pipe is opened.

A feed wire 36 from a source of electric power, as a generator not shown at a central power station, passes through a point 37, a resistance 38, a point 39 and a point 40, to a point 41 and beyond. A return wire 42 passes from a binding screw to be described through points 43 and 44 and thence to the source of power. A hand switch 45 is operated to make and break connections in the wires 36 and 42 between the generator and the points 37 and 44. From the point 37 a main branch wire 46 leads to one end of the resistance wires 2. From the other end of these wires a wire 47 leads to the binding post of an upper contact bracket 48 insulated from the frame 49 of a main electric switch A. From the binding post of a lower contact bracket 50, also insulated from the frame 49, a wire 51 leads to the point 43.

Placed in any convenient place in the refrigerator R, from which it is desired that the local temperature shall exercise control over the operation of the machine, is a thermostat T$r$, having a binding post 52 (see Figs. 7 and 10) connected with a low limit contact on the left, having a binding post 53 connected with a high limit contact on the right, and having a common central binding screw 54, all of which are insulated from the frame of the thermostat. From the point 41 a wire 55 leads through a main solenoid 56, secured to the frame 49, to a point 57. From the point 57 a wire 58 leads to the binding post 52. The wire 42 leads from the binding screw 54. From the point 40 a wire 59 leads through a point 60 and an electro-magnet 61, secured to the frame of the valve E, to the point 57.

From the point 39 a wire 62 leads to a point 63. From the point 63 a wire 64 leads through an electro-magnet 65, secured to the frame 49, to a point 66. From the point 63 a wire 67 leads through a solenoid 68 of an automatic circuit breaker B to the point 66. From the point 66 a wire 69 leads to an insulated journal bracket 70 (see Figs. 13 and 14) secured to the circuit breaker B above the solenoid 68. From a corresponding insulated journal bracket 71 in like manner secured to the circuit breaker a wire 72 leads to a binding post 73 (see Fig. 20) at the right lower part of an adjustable thermometer thermostat T$s$. From a binding post 74 at the left lower part of the same thermostat a wire 75 leads to the point 44.

From the point 60 a wire 76 leads through an electro-magnet 77, secured to the frame of the valve E, to a point 78. From the point 41 a wire 79 leads through a solenoid 80, secured to the frame 49, to the point 78. From the point 78 a wire 81 leads to the binding post 53.

In the valve SW a short cylindrical casing 82 is bolted to the bottom of the frame 49 and has opposed threaded ports into which the pipes 26 and 34 respectively are screwed. An ordinary valve plug 83 with a straightway passage as indicated by dotted lines in Fig. 2 occupies the casing and is inclosed by a face plate 84, through which the shaft of the plug extends. To the outer end of the plug 83 is keyed a pinion 85. With the pinion and adjacent parts above in the positions shown in Figs. 1 and 2 there is a free passage through the valve between the pipes 26 and 34.

In the switch A the frame 49 is constructed so that it can be bolted to any convenient vertical surface. The solenoid 56 extends horizontally and is secured at its opposite ends to brackets extending frontward from the frame 49 over the valve SW. Its core 86 is of the usual soft iron construction. Fitted into its right end as seen in Fig. 2 is the turned extremity of a squared T piece 87, made of some non-magnetic metal such as brass and having a depending arm. The depending arm in the position shown in Fig. 2 abuts against the right bracket supporting the solenoid, being at that place a perforated boss for that purpose, so as to prevent the core from being thrust too far to the left when the solenoid is not energized. The outer horizontal end of the T piece 87 passes through and is guided by the central part of a sub-frame 88, secured to the frame 49 and to the inside of the jaws of which, projecting to the right, the insulated brackets 48 and 50 are attached. The upper side of the horizontal arm of the T piece 87 has a nose 89 with its vertical face toward the left. A horizontal rod 90 has its left end supported in the right bracket supporting the solenoid 56 and its right end supported in the sub-frame 49 below the aperture through which passes the horizontal arm of the T piece 87; and it also passes through an opening in the depending arm of the T piece, thereby assisting in its guidance. A coiled spring 91 enspirals the rod 90 and abuts at one end against the sub-frame 49 and at its other end against the depending arm of the T piece, thereby tending to thrust the T piece 87 and the solenoid 86 to the extreme left so far as the depending arm will permit. Screwed to the end of the horizontal arm of the T piece 87 to the right of its passage through the sub-frame 49 is the yoke of an insulated double pole switch 92 of laminated copper.

The brackets 48 and 50 are of cylindrical shape with inclosed ends. Through the inclosed ends of the bracket 48 reciprocates a rod 93 having within the cylinder a collar 94 and outside of it to the left a contact head 95 adapted to make contact with the upper pole face of the switch 92. A coiled spring 96 enspirals the rod 93 and abuts at one end against the inside of the right end of the bracket and at its other end against the collar 94, thereby tending to thrust the head 95 to the left. Similarly a rod 97 reciprocates through the inclosed ends of the bracket 50, having within the cylinder a collar 98 and outside of it to the left a contact head 99 adapted to make contact with the lower pole face of the switch 92. A coiled spring 100 enspirals the rod 97 and abuts at one end against the inside of the right end of the bracket and at its other end against the collar 98, thereby tending to thrust the head 99 to the left. Pivoted at 101 to the frame 49 is a dog 102 having an armature on its upper surface. This armature is located immediately under the electro-magnet 65. The dog is so located that when the T piece 87 is thrust to the right it normally engages the nose 89 so as to keep the switch 92 in contact with the heads 95 and 99; but when its armature is lifted, the dog permits the T piece 87 to pass to its extreme left position as shown in Fig. 2.

A squared horizontal rack 103 passes through and is guided by the extreme lower ends of the projecting brackets on the frame 49, which support the solenoid 56, so as to be parallel with the solenoid. The teeth of the rack on its under side also engage the pinion 85. The right end of the rack turns upward into a detent 104 adapted to be engaged by the right side of the depending arm of the T piece 87 when the latter is thrust to the right. The effect of such an engagement is to pull the rack 103 to the right and to rotate the pinion 85 so as to close the valve SW. Projecting above the rack 103 is a lug 105 perforated for the reciprocation of a horizontal rod 106 supported at its right end in the right bracket supporting the rack and held in place at its left end by a nut 107 to the left of the lug. A strong coiled spring 108 enspirals the rod 106 between its right support and the lug 105, thereby tending to thrust the rack 103 to the left and thus to open the valve SW through the pinion 85. The nut 107 in its travel to the left abuts against the right side of the left bracket supporting the rack 103 and thereby holds the valve SW in an exactly open position. The extreme left end of the rack is also supported and guided by its passage through a bracket 109 depending from the left lower part of the frame 49.

The solenoid 80 is vertical. Secured to the lower end of its core 110 is a rod 111 passing through brackets 112 and 113 secured to the frame 49. Secured to the rod 111 just above the lower bracket 113 is a collar 114. A coiled spring 115 enspirals the rod 111 and abuts at its top against the under side of the bracket 112 and at its bottom against the upper side of the collar 114. The parts are so constructed that when the rack 103 is thrust to the right the spring 115, acting on the collar 114, tends to thrust the rod 111 downward so that it will drop to the left of the left end of the rack and thereby will hold the rack practically in its extreme right position, notwithstanding any force the spring 108 may exert. But when the rod 111 is lifted even for an instant the spring 108 is free to act; and when the spring does so act, while the rod is lifted, the rod on dropping will rest on the rack as shown in Fig. 2.

While for the refrigerator R any kind of thermostat may be employed that closes one electric circuit at a predetermined high contact limit and closes another electric circuit at a predetermined low contact limit, the two limits being a few degrees apart, the best results are obtained by the use of the thermostat, Tr, or of one constructed on the same general principle. In it a back frame 116, that can be screwed to any vertical surface, having a frontwardly projecting base 117, supports in its upper part a frontwardly projecting slotted post 118, extending through the back frame and adjustably secured on the back side of the frame by the nut and washer 119. Secured into the slot of the post 118 by a screw 120 is the inner end of a coiled band 121, constructed of two metal strips of different coefficients of expansion; such as soft steel and brass brazed together, the brass, being the more expansive, forming the outside of the band. To the outer end of the band 121 is secured a depending arm 122, more or less parallel with the vertical center of the frame 116, and having a striker 123 at its lower extremity.

Screwed to the base 117 but insulated from it is a back trunnion bracket 124 and a front trunnion bracket 125, each consisting of a bottom and upper part screwed together. Supported between these brackets by a back trunnion 126 and a front trunnion 127, passing through the upper and lower parts of the brackets 124 and 125 respectively, is a rocker 128, made of tough glass and supported at its center by brass clamping bands 129 and 130 to which the inner ends of the trunnions 126 and 127 respectively are secured as constituent parts, the clamping bands being firmly bolted together above and below the rocker. To the rear end of the trunnion 126 back of the trunnion bracket 124 is a jawed lever 131 secured at its lower part by a set screw to the trunnion so as to be able to rotate it. Through threaded openings in the jaws of the lever are two adjustable screws 132 and 133 projecting inwardly so that the striker 123 is between their points and will strike one or the other of them as it is moved back and forth and will thus actuate the lever.

The bottom of the rocker 128 has secured to it a copper strip 134 forming a path for a copper ball 135 to roll upon as the rocker is tilted to one side or the other. At the extreme ends of the rocker beyond each end of the strip 134 are slight depressions 136 and 137 in which the ball rests after the rocker has been tilted into its extreme position on one side or the other. Between the center and the ends of the rocker casing on its upper side are two raised openings to which glass caps 138 and 139 are hermetically secured. From the cap 138 at the left of the center of the rocker as seen in Fig. 6 depends a copper support, passing through and fused into the cap, to which support a copper contact 140 is pivoted, being insulated on its flat under edge and on the lower part of its broad side toward the left end of the rocker. From the cap 139 at the right of the center of the rocker depends a copper support, passing through and fused into the cap, to which support a copper contact 141 is pivoted, being insulated on its flat under edge and on the lower part of its broad side toward the right end of the rocker. As the ball 135 rolls from the right end of the rocker it impinges against the insulated part of the contact 141 and lifts it up as it passes without coming in contact with its non-insulated part; but when the ball reaches the contact 140 it impinges against its non-insulated part until it has lifted it up sufficiently to pass by. As the ball passes by each contact after lifting them up the contacts resume their perpendicular positions. As the ball 135 rolls from the left end of the rocker, the reverse process takes place as the contacts are past. Through temporary openings at 142 or 143, after the ball 135 has been inserted into the rocker 128 and after the caps 138 and 139 have been hermetically sealed, the air is exhausted from the rocker and the openings are closed by fusion.

The bracket 125 extends upward and has an insulated arm extending frontward through which pass copper bolts 144 and 145 to the top of which respectively are secured the binding posts 53 and 52. The bracket 125 also has an insulated cylinder secured to its front through which the trunnion 127 passes. Inserted into the left and right of this cylinder as seen in Fig. 11 are binding screws 146 and 147 respectively. From the under end of the bolt 144 a spring 148 coils around the cylinder to the screw 147. From the screw 147 a wire 149 passes in front of the rocker 128 to the copper support protruding through the cap 139. From the under end of the bolt 145 a spring 150 coils around the cylinder to the screw 146. From the screw 146 a wire 151 passes in front of the rocker to the copper support protruding through the cap 138. Fused into the rocker 128 so as to be in contact with the strip 134 is a wire 152 in contact at its other end with a band 130. The binding screw 54 is one of the screws holding down the upper part of the bracket 125. As the non-insulated part of the bracket 125 is of brass, a conductive connection exists between the strip 134 and the wire 42.

Secured to all sides of the back frame 116 is a protecting casing 153 perforated on its sides for a free thermal action of the surrounding atmosphere on the band 121. The front of the casing is divided into an upper part 154, pivoted at its lower end on a rod so as to open downward for free access to the band 121 and the arm 122, and into a lower part 156, projecting frontward so as to cover the parts supported by the base 117 and also pivoted on the rod 155 so as to open upward for free access to these parts. A coiled spring 157 on the rod 155 with projecting ends bearing on the parts 154 and 156 tends to keep the front of the casing closed. Snap pieces 158 and 159 also normally snap into the parts 154 and 156 respectively and hold them closed. In the part 154 is supported an ordinary mercury glass bulb and tube thermometer 160 for observing the temperature changes in the refrigerator R. The wires 58 and 81 may lead to the binding posts 52 and 53 respectively through insulated openings in the bottom of the casing 153; and the wire 42 may lead from the binding screw 54 through a like opening in the casing.

While certain parts of the thermostat and of the other details of the machine yet to be mentioned are described as being of copper or brass, it is to be understood that any other electrically conductive material such as aluminum may be used. And the vessels in like manner referred to as containing mercury may be of glass or other material, glass being, however, preferable owing to its imperviousness and transparency.

In the automatic circuit breaker B a doubly flanged glass casing 161 is supported between its flanges by partially encircling trunnion supports 162 and 163 separated from each other by insulation 164 above the casing and insulation 165 below the casing and having their trunnions journaled in the brackets 70 and 71 respectively. In looking at the casing in a horizontal direction parallel to its flanges, as in Figs. 12 and 15, an opening 166 is seen through the casing, surrounded, however, by the wall of the casing so that there is no opening into the casing. In Fig. 15 the part of the casing wall 167, seen in vertical section, surrounds the opening 166 through the casing. From the trunnion of the support 162 a wire 168 leads into the opening 166 and thence is fused into the left part of the wall 167 as seen in Fig. 15 so as to extend into the inside of the casing. From a point directly and horizontally opposite the termination of the wire 168, when the casing 161 is in its normal position, a wire 169 leads from the inside of the casing through its outer wall, being fused therein, to the trunnion of the support 163. Keyed to the trunnion part of the support 162 inside of the bracket 70 is a pinion 170, insulated from the trunnion. One part of the circuit breaker consists of a frame 171, attachable to any convenient vertical surface, having an upper platform above the solenoid 68 and supporting the brackets 70 and 71, and a projecting bracket 172 on which the lower end of the core 173 of the solenoid normally rests. Secured to the upper end of the core 173 within the solenoid is a rack 174, the teeth of which engage the pinion 170 so that when the solenoid is energized the casing 161 is tilted clockwise, when seen from the view point in Figs. 12 and 15, through a quarter circle.

Between the left wall of the casing 161 as seen in Fig. 15 and the left part of the wall 167, just above the inserted ends of the wires 168 and 169, the passageway in the casing is narrowed by a projecting ridge 175 so that when the casing is tilted in the manner just described the flow of any fluid past the ridge will be somewhat retarded. Vertically midway between the insulations 164 and 165 the casing 161 is recessed and has a cylindrical opening at its center into the body of the casing. The outer and wide part of the recess 176 to the right, as seen in Fig. 15, has three lugs 177, 178 and 179 extending out over the next narrower part of the recess to the left 180, into which is fitted a flanged piece 181 having slots 182, 183 and 184 a little larger than the lugs, so that the piece 181 is slipped to the left of said lugs and is there locked in place against the lugs by pins 185 driven into it. The piece 181 is cylindrically threaded through its center for the insertion of an axial piece 186 correspondingly threaded and bearing a glass needle 187 with a conical head extending in a horizontal direction to the left so as to partially close the passage between the bottom part of the wall 167 and the outside of the casing 161, which are narrowed toward each other for that purpose at that place. The piece 186 has a longitudinal squared opening at its center toward the right, into which is inserted a squared rod 188 extending through a square opening in a soft iron turning bar 189 into a glass face plate 190 hermetically sealed to the casing 161 and serving as a journal for cylindrical right end of the rod 188. By the use of a horse shoe magnet brought close to the plate 190, the bar 189 can be turned around in either direction from outside the casing so that the rotation of the rod 188 and the nut 186 will cause the needle 187 to fill its passageway to a greater or less extent as may be desired. The casing 161 is to be partially filled with mercury 191 so as to cover the inserted ends of the wires 168 and 169 when the casing is in the position shown in Fig. 15. After the parts have been inserted and the plate 190 has been sealed on, and after the supply of mercury has been introduced through an opening at the top for that purpose, the air is exhausted from the casing and the opening is closed by fusion.

In the adjustable thermometer thermostat Ts a frame 192 is flanged and threaded at the right as seen in Fig. 18 for horizontal insertion into the side of the still S a convenient distance from the top. Through the horizontal axial opening in the flanged and threaded part of the frame the reservoir of a glass mercury tube 193 is inserted, the indicating part of the tube being vertical and being attached to the vertical front of the frame. The horizontal part of the tube also passes through a stuffing box 194 provided on the back of the frame. A perforated casing 195, inclosing the end of the tube inserted into the still and screwed to the end of the frame 192, protects the tube 193 from accident. Straddling the neck of the frame 192, between its vertical and horizontal part, is a thin casing 196, inclosing the frame at its back and sides and extending up above the frame. Inserted into the slotted top of the frame 192 and supporting the top of the casing 196 is a semicircular face top 197 of insulating material. Into the top near its circumference are inserted six cup contacts 198, 199, 200, 201, 202, and 203, corresponding to temperatures of 300, 308, 316, 324, 332 and 340° F. as marked and having binding posts on the back of the top 197. Through the center of the top is inserted a brass bolt 204 fitted with a washer and with nuts back of the top so as to be a binding post. Pivoted to the front of the bolt 204 is a spring plug contact 205 having a knob handle at its outer extremity and adapted for being turned and sprung into any of the cup contacts. From the binding post 73, secured to the frame 192, a wire 206 leads between the frame and the casing 196 to the binding post 204. Fused into the left side, as seen in Fig. 20, of the vertical indicating part of the tube 193, at points to which the mercury will reach at temperatures of 300, 308, 316, 324, 332 and 340° as marked and extending just inside the tube, are corresponding wires 207, 208, 209, 210, 211 and 212, passing between the frame 192 and the casing 196 and leading to the binding posts 198, 199, 200, 201, 202 and 203 respectively. The openings for the passage of these wires through the frame and the corresponding openings on the opposite side of the tube, to be described, are insulated. Fused into the right side of the tube 193 and proceeding from just inside the tube opposite the inserted ends of the wires 207, 208, 209, 210, 211 and 212 are wires 213, 214, 215, 216, 217 and 218 respectively. A wire 219 joins the ends of these latter wires between the frame 192 and the casing 196 and leads to the binding post 74 also secured to the frame 192. A beveled glass front 220 incloses the vertical part of the tube 193 within the frame. After a proper amount of mercury has been introduced into the tube to reach the several opposed wire ends at the temperatures as marked and after the air has been exhausted, the tube is closed by fusion.

In the sensitive doubly actuated expansion valve E a lower casing 221 has cast as a part thereof a perforated lateral entrance boss 222 and a perforated outlet into which the expansion coil K is fitted. Superimposed upon it is an upper casing 223 correspondingly flanged so as to hold a diaphragm 224 between the flanges bolted together. The diaphragm is so flexible or resilient that at the center it can be moved up or down while its periphery remains stationary. Extending centrally through the diaphragm is a screw 225, its top above the diaphragm being in the form of an annular pocket for receiving the lower end of a coiled spring 226. The thrust exerted by the spring is regulated by the elevation or depression above the spring of a collar 227, which is held from turning by a tongue projection fitting into a vertical groove 228. Threaded into the collar is an adjusting screw 229, which extends up through a stuffing box and is provided at its top with a wrench section for turning the screw when it is desired to adjust the thrust of the spring 226 upon the diaphragm. The valve casings may be secured to any convenient vertical surface by a bracket 230.

Threaded on the screw 225 is a slotted bar 231; it is guided by the walls of the lower casing, but fits somewhat loosely therein. By this loose fit a sufficient space is left so that gas can pass up between the bar and the casing and impinge against the under side of the diaphragm. Threaded into the slotted bar and extending upward into the slot is a conical valve 232. On the under side of the center of the slotted bar is a small boss 233. Near the bottom of the lower casing 221 below the outlet is a recess perforated at the back and provided with a stuffing box for the passage of a lever shaft 234. The end of the shaft within the recess is squared for the securing thereto of an inner lever 235, extending horizontally so that its end is immediately under the boss 233. A closing cap 236 is screwed on to the bottom of the lower casing.

An entrance piece 237 rests in the perforation of the boss 222 for a part of its length and has a cylindrical boss at its inner end resting in a recess in the opposite wall of the casing 221 above the outlet. The entrance piece is a solid rod of comparatively large diameter bored out centrally from its outer end up to a place that will be in the axial center of the casings. Thence the piece has a downward bore at right angles to the first bore ending in a conical valve seat upon which the valve 232 can be seated. The entrance piece is prevented from turning by a key 238 and is further kept in place by a gland and packing 239 through which the pipe 21 enters.

To the outside end of the lever shaft 234 is secured an outer lever 240, extending in a horizontal direction opposite to that of the inner lever and ending in a horizontal slot. A frame 241 is attachable to the same surface as the bracket 230 and abuts against an extension to the right of its lower casing. Pivoted on the frame at 242 is a bellcrank lever having its main arm 243 extending horizontally toward and terminating just over the slot of the lever 240. Substantially at right angles to the main arm an upper arm 244 extends upward, having on the side opposite the main arm a projecting arm 245 with an armature on its under side. Immediately under this armature the electro-magnet 77 is secured to the frame 241. A dog 246, having an armature on its upper side, is pivoted at 247 to the frame 241 and is toothed at its outer end so as to rest on top of the upper arm 244 when the main arm is depressed and the upper arm is consequently rotated to the left. But when the projecting arm 245 is depressed, the upper arm is rotated to the right so as to be engaged and locked in position by the toothed end of the dog 246.

Immediately over the armature of the dog 246 the electro-magnet 60 is secured to the frame 241.

A vertical rod 248 is adapted for reciprocation through annular guide openings at 249 and 250 in the upper and lower parts of the frame 241. Above the lower guide 250 a disk and lock nut 251 are longitudinally adjustably secured to the rod. A heavy coiled spring 252 enspirals the rod 248, abutting at its top against the under side of the frame near the opening 249 and at its bottom on the upper side of the disk. The longitudinal position of the disk thus determines the thrusting force of the spring. The spring 252 is so constructed as to have a greater thrusting force than the spring 226. The lower end of the rod 248 passes through a fork in the extreme end of the main arm 243 and at its extreme end carries a frontwardly projecting pin which fits into the slot of the lever 240. Fitted on to the rod below the guide opening 250 and above the main arm 243 is a small longitudinally adjustable disk and lock nut 253 resting upon the main arm. The spring 252 is thus effectual to depress the main arm 243 and the lever 240 so as to absolutely seat the valve 232 at such times as the spring is not sufficiently compressed by an upward force applied to the disk 253 through a depression of the projecting arm 245 or a holding of the same depressed by the dog 246. It is evident that the disk and lock nut 253 may be adjusted so far up on the rod 248 as to permit of the valve 232 being opened to its greatest capacity, upon an elevation of the arm 243; and that, on the other hand, they may be adjusted so far down on the rod as to permit of various degrees of partial openings of the valve, when the rod is elevated and as the spring 226 forces the boss 233 down upon the lever 235.

In the automatic condenser water valve CW (see Fig. 1) an upper casing 254 and a lower casing 255 hold between their peripheral flanges a flexible or resilient diaphragm like the diaphragm 224. Projecting through the top of the casing 254 is a rod 256 equipped with a washer pressing against the upper side of the diaphragm at its lower end and at its upper end pivoted on a lever 257. The lever 257 is pivoted at its left end to a frame 258 attachable to any convenient vertical surface, is horizontally slotted at its right end and intermediately carries the pivoted end of the rod 256. A coiled spring 259 enspirals the rod 256, abuts at its top against the under side of the frame 258 and is secured at its lower end on the rod so as to tend to depress the diaphragm through the rod. The pipe 19 leads into the casing 255. The above described parts can be further understood by reference to the corresponding parts of the similar valve D, to be described. In a casing 260 is an ordinary gate valve having a stem 261 projecting above the casing and having at its top a pin fitting into the slotted end of the lever 257. The pipe 25 leads into the casing and the pipe 31 leads from it.

The method of operation is as follows: It is assumed that it is desired to maintain in the refrigerator R some temperature ranging say between 35 and 37° F. The major adjustment of the thermostat $Tr$ is made through the nut 119 so that the arm 122 will be approximately parallel with the vertical center of the frame 116 at the mean temperature of 36°. The minor adjustment is made by turning the screws 132 and 133 so that the striker 123 at the desired mean temperature is midway between them. And the distance apart of the inner ends of the screws, as the same are adjusted, determines the extremes of temperature within which the refrigerator temperature is maintained. For the low limit of 35° the screw 132 is so adjusted that, as the band 121 contracts, it moves the arm 122 to the left until the striker 123 has tilted the lever 131 and the rocker 128 so far to the left that the ball 135 rolls along the strip 134 into the depression 136. And for the high limit of 37° the screw 133 is so adjusted that, as the band 121 expands, it moves the arm 122 to the right until the striker 123 has tilted the lever 131 and the rocker 128 so far to the right that the ball 135 rolls along the strip 134 into the depression 137.

It is also assumed for the present that the still casing S has been properly supplied with a strong solution of aqua ammonia rising well above the included part of the pipe 34; that the still casing has been heated in the prior cycle so as to drive over into the condenser tank C a proper supply of ammonia gas, which has there become liquefied as will be explained; and that now the still casing is cold, the expansion valve E is open and the valve SW is open as shown in Figs. 1 and 2. Consequently liquid ammonia as it enters the coil K vaporizes and takes up heat from the refrigerator R; and the water of the cold "weak liquor" in the still casing absorbs the spent ammonia gas as it passes out from the included end of the coil. The heat produced by the combination of the ammonia with the water is in part taken care of by radiation from the walls of the still casing into the atmosphere, but is principally carried away by the water flowing through the pipe 34, its quantity being regulated by the valve 35. Obviously the greater the ratio between the quantity of ammonia entering the still casing as compared with the volume of weak liquor, the greater must be the flow of cooling water. On the other hand with a small quantity of ammonia entering the still casing and a large volume of weak liquor, the radiation into the atmosphere from the still casing walls is sufficient to counteract the heating effect of the combination. During all this time the check valve 13 remains closed inasmuch as the pressure in the condenser tank C is much greater than in the still casing.

As shown in Fig. 6, the striker 123 has just made contact with the screw 132. As the refrigerator R still further cools to 35°, the lever 131 and the rocker 128 are tilted to the left and the ball 135 rolls along the strip 134. As the ball hits the contact 140 one branch current passes from the point 40 through the wire 59, the point 60 and the electro-magnet 61 to the point 57 and another branch current passes from the point 41 through the wire 55 and the solenoid 56 to the point 57; and thence the united current passes through the wire 58, the binding post 52, the bolt 145, the spring 150, the screw 146, the wire 151, the cap 138, the contact 140, the ball 135, the strip 134, the wire 152, the band 130, the trunnion 127, the bracket 125, the screw 54 and the wire 42 to the source of power, the switch 45 being closed all the time the machine is in service. As the ball passes along into the depression 136 the current is broken. But as the contact with the contact 140 was in vacuum, when the contact was broken there was no sparking and no wearing away of the parts. And as the contact was instantaneous no energy was consumed over and above what was necessary to actuate the electro-magnet 61 and the solenoid 56.

The instantaneous energization of the electro-magnet 61 lifts the dog 246. Thereupon the spring 252 depresses the main arm 243 and the lever 240 and seats the valve 232 by bearing upward on the boss 233 through the lever 235 so as to absolutely close the valve E against the passage of ammonia into the coil K. As the arm 243 is depressed the upper arm 244 is rotated to the left so as to be unlocked under the dog 246, when the electro-magnet is deënergized, as shown in Fig. 21.

The instantaneous energization of the solenoid 56 forces the core 86 and the T piece 87 to the right so that the switch 92 makes contact with the heads 95 and 99, the force of the impact being diminished by the springs 96 and 100. Simultaneously the dog 102 engages the nose 89 and maintains the contact after the deënergization of the solenoid. Also simultaneously the depending arm of the T piece pulls the detent 104 to the right so that the rack 103 and the pinion 85 close the valve SW against the passage of water into the still casing. As the rack 103 is pulled to the right, the spring 115 acting on the collar 114 depresses the rod 111 and locks the rack 103 in position with the valve SW closed.

A current now passes from the point 37 through the wire 46, the heater 1, the wire 47, the bracket 48, the rod 93, the head 95, the switch 92, the head 90, the rod 97, the bracket 50, the wire 51, the point 43 and the wire 42 to the source of power. Whatever heat has remained in the solution, at the time the valve SW was closed, is now of advantage. As the resistance wires 2 become heated their heat is imparted to the strong solution in the still casing. Consequently hot ammonia gas separates from the water and passes through the pipe 7 into the analyzer 9, carrying with it, however, a certain amount of entrained moisture. This moisture is in part removed as the gas impinges against the baffle plates 11. Almost all of the moisture has been separated out as the gas emerges from the pipe 12 as it there has been somewhat cooled by the water in the rectifier 10. As the pressure in the still casing S became greater than that in the coil K, the check valve 5 closed; and as the pressure of the ascending gas now becomes greater than that of the gas in the upper part of the pipe 18 and in the pipe 15, the check valve 13 now opens and the gas passes over into the condenser tank C.

The increased pressure of the expelled gas, as shown by the gage H, now presses against the under side of the diaphragm held between the casings 254 and 255 of the valve CW until finally the thrust of the spring 259 is overcome. Consequently the lever 257 and the stem 261 are lifted so that cooling water now flows through the pipe 25 into the condenser tank C and thence through the rectifier 10. The spring 259 is so adjusted that it will remain closed until a gas pressure is reached that is somewhat above the pressure of the gas at the temperature of the atmosphere. For instance if the temperature of the atmosphere is 80°, the pressure as shown by the gage H will be 140 lbs. Consequently the spring 259 must be so adjusted that the valve CW will not open until the pressure of 140 lbs. is exceeded; otherwise water will be flowing when not needed. And if the temperature of the atmosphere rises to 90°, the corresponding gage pressure rises to 168 lbs.; and the spring 259 must be again adjusted so that the valve will not open until a higher pressure is reached. But if the atmospheric temperature rises to 100°, the corresponding gage pressure is 200.5 lbs. On the other hand the valve CW might have to be adjusted to open at about 180 lbs., corresponding to a temperature of 94°, even if condensing water runs to waste a part of the time; for it is not economical to oppose more than 180 lbs. pressure against the opening of the check valve 13. If, however, the spring 259 had originally been adjusted to open at a pressure of 180 lbs., this would have been too high for an economical operation at moderately warm temperatures. This difficulty in the use of the valve CW in very warm places, and the need of its adjustment with the changes of the seasons, exists also with similar valves used in compression machines and illustrates the advantage of the valve D to be described.

As the temperature rises in the still casing S, more and more ammonia is expelled until finally a limit is reached beyond which it is no longer economical to heat the solution. This limit depends in part upon the head pressure, as shown by the gage H, against which the gas is being expelled; and this head pressure in turn depends upon the coolness and quantity of condensing water flowing through the valve CW. With warm and little condensing water a head pressure cannot be obtained below 180 lbs. With more and cooler water the head pressure may be reduced to 140 lbs. But a point is reached, determined by experiment, when it is not economical to increase the flow of water. Suppose this point is such as to make the proper head pressure to be 160 lbs.

Against a head pressure of 160 lbs., at a temperature of 300°, the percentage by weight of the ammonia in the solution is reduced to 13 per cent.; at 308°, to 11½ per cent.; and at 316°, to 9¼ per cent. But although a higher heat limit results in a greater expulsion of ammonia, it has been found that a heat limit of 300° is preferable. For with a heat limit not above that degree the quantity of moisture entrained over is inconsiderable.

Accordingly the plug contact 205 was sprung into the cup contact 198, corresponding to the temperature of 300°, when the machine was first started. When the temperature in the still casing rises to 330°, the mercury in the tube 193 makes connection between the wires 207 and 213. Thereupon one branch current passes from the point 63 through the wire 64 and the electro-magnet 65 to the point 66 and another branch current passes from the point 63 through the wire 67 and the solenoid 68 to the point 66; and thence the united current passes through the wire 69, the bracket 70, the trunnion support 162, the wire 168, the mercury 191, the wire 169, the trunnion support 163, the bracket 71, the wire 72, the binding post 73, the wire 206, the binding post and the bolt 204, the plug contact 205, the cup contact 198, the wire 207, the mercury in the tube 193, the wire 213, the wire 219, the binding post 74, the wire 75, the point 44 and the wire 42 to the source of power.

The consequent energization of the solenoid 68 tilts the casing 161 so that the mercury 191 flows away and breaks the connection between the wires 168 and 169. But before this occurs the electro-magnet 65 has been energized long enough to lift the dog 102 until the spring 91 has pushed the T piece 87 and the core 86 to the left as shown in Figs. 1 and 2 thus opening the switch 92 and shutting off the current to the heater 1. This movement leaves unchanged the position of the rack 103. With the breaking of the current between the wires 168 and 169, the electro-magnet 65 and solenoid 68 become deënergized and the dog 102 and the core 173 drop to their normal positions. Thereupon the mercury 191 begins to flow by the needle 187 and to rise toward the level of the wires 168 and 169. The needle 187 is so adjusted, however, that the mercury does not connect the wires 168 and 169 until after the mercury in the tube 193, in consequence of the natural fall of temperature in the still casing from 300°, has ceased to connect the wires 207 and 213. Should, however, connection not be so broken between the wires 207 and 213 before the connection is reëstablished between the wires 168 and 169, the only effect would be a further energization of the electromagnet 65 and of the solenoid 68 without interfering with the operation of the machine.

The machine is now in a condition of cold inaction. The temperature in the refrigerator R is slowly rising from 35° and the striker 123 is traveling toward a contact with the screw 133. The parts are so proportioned that before such contact occurs, the still casing S has cooled down to atmospheric temperature. The valve CW, it will be observed, remains open after the heating of the still casing has ceased and until the head pressure drops to the pressure for which the spring 259 was adjusted. The water flowing during this time is of course wasted. As the still casing cools down it tends to absorb whatever gas has not passed over from the moisture separator M and as the pressure of this gas drops the check valve 13 closes and eventually the check valve 5 opens.

When the temperature in the refrigerator R rises to 37° the lever 131 and the rocker 128 are tilted to the right and the ball 135 rolls along the strip 134. As the ball hits the contact 141 one branch current passes from the point 40 through the wire 59, the point 60, the wire 76 and the electro-magnet 77 to the point 78 and another branch current passes from the point 41 through the wire 79 and the solenoid 80 to the point 78; and thence the united current passes through the wire 81, the binding post 53, the bolt 144, the spring 148, the screw 147, the wire 149, the cap 139, the contact 141, the ball 135, the strip 134, the wire 152, the band 130, the trunnion 127, the bracket 125, the screw 54 and the wire 42 as before.

Here, as before, as the ball passes along into the depression 137, the current is broken after an instantaneous contact without sparking or a wearing away of the parts.

The instantaneous energization of the solenoid 80 lifts the rod 111. Thereupon the spring 108 thrusts the rack 103 to the left and opens the valve SW. Simultaneously the energization of the electro-magnet 77 depresses the projecting arm 245. Thereupon the dog 246 engages and locks in position the upper arm 244. Consequently the spring 252 is compressed by the main arm 243 and is rendered inoperative. Thereupon the spring 226 depresses the diaphragm 224 and unseats the valve 232 to its extreme low position. The spring 226 is free so to act because, when the main arm 243 compressed the spring 252, it also lifted the lever 240 and lowered the lever 235 so as to be wholly off the boss 233 in its extreme low position. Liquid ammonia is now passing through the pipe 21 and the entrance piece 237 into the slot of the bar 231 where it begins to vaporize. Thence the ammonia passes through the outlet of the lower casing 221 into the expansion coil K to take up the heat from the refrigerator R.

But a part of the ammonia passing into the slot of the bar 231, as it vaporizes, rises between the bar and the casing 221 and impinges against the diaphragm 224. Consequently, with the spring 226 properly adjusted, if at any time the pressure in the coil K should become excessive, the pressure on the diaphragm 224 will tend to overcome the spring, to throttle the valve 232 and thus to diminish the flow of liquid ammonia.

The cycle of operation is now complete and the machine will continue to maintain in the refrigerator R a range of temperature between 35 and 37°. The supply of current to the heater 1 may be such as to raise the still casing S to the required maximum of temperature in an hour or even longer as found expedient in various circumstances. The most economical quantity of water for the still casing S can be determined by regulating the valve 35, the valve 28 being used only when it is desired to shut off the water entirely from that part of the machine. And the maximum of water supply for the condenser tank C and the moisture separator M can be determined by a regulation of the valve 27.

To charge the machine with the strong solution of aqua ammonia, first a vacuum is pumped through the valve 23 and then, the valve 23 being closed, the strong solution of aqua ammonia is introduced through the valve 6. The valves 4, 8, 16, 17 and 20 are closed only when it is desired to shut off some part of the system for convenience of adjustment or repairs. To start the machine now, or at any time when the lower part of the pipe 18 does not contain a supply of anhydrous liquid ammonia, the switch 92 is moved by hand to the right until the dog 102 engages the nose 89. The first automatic action occurs when the thermostat $T_s$ acts in the manner before described; but no further automatic action takes place for the present, because the ball 135, at the usual atmospheric temperature when the machine is started, is resting in the depression 136. Accordingly after waiting until the still casing S has cooled down to about atmospheric temperature, the arm 244 is engaged by hand with the dog 246 so as to open the valve E and the collar 114 is lifted by hand so as to open the valve SW. The operation from thence forward is entirely automatic. If at any time air gets into the ammonia circuit, it can be blown off when the machine is inactive by means of the valve 14. Also the solution can be strengthened at any time by closing the valve 22 and introducing anhydrous liquid ammonia through the valve 23 while the refrigerator R is being cooled.

In case at any time there is an insufficiency of cooling water, the only effect is to diminish the efficiency of the machine. For if such an insufficiency occurs while the still casing S is being heated, then, as the head pressure rises, less gas is able to pass over into the condenser tank C. When the predetermined heat limit is reached the heating process simply stops as before, leaving, however, a greater percentage of ammonia in the solution and more and denser ammonia gas above the solution than good practice calls for. If the case should be so extreme that enough ammonia has not been expelled for the next run of the machine, then, when no more liquid ammonia passes through the valve E, the thermostat $T_s$ fails to reach its low limit and the operation of the machine simply ceases. And if such an insufficiency occurs while the refrigerator R is being cooled, the still casing S is less able to absorb gas from the coil K. Consequently the pressure in the coil tends to rise and to shut off the supply through the valve E. This means that it takes longer to cool the refrigerator R. And in an extreme case the quantity of heat taken up by the coil would be less than the quantity of heat passing inward through the walls of the refrigerator; in other words the temperature of the refrigerator, instead of being cooled, would tend to rise to that of the atmosphere. Here also the operation of the machine would stop entirely after the supply of liquid ammonia in the condenser, acquired from the previous heating, had become exhausted. A similar result would occur if the particular machine installed for a given duty should be too small for its requirement; or if the refrigerator door should carelessly be left open for tool long a time.

Next considering the alternative constructions of Figs. 26 to 34 inclusive. Here the parts that are identically the same as those in the preceding figures are indicated by the same characters; and the parts that have the same functions and are so nearly the same as in the preceding figures as to need no further description are indicated by the same characters with the addition of an "a."

In the alternative form of an automatic condenser water valve D, the diaphragm 262, bolted between the flanges 254 and 255 is flexible or resilient and has washers on each side through which the rod 256 passes. The spring 259 is secured to the rod 256 by means of a nut and washer 263 so as to be longitudinally adjustable for altering the thrust of the spring when desired. A valve casing 264, into opposite ends of which the pipes 25 and 31 are fitted, contains an ordinary straightway plug valve 265. To the outside end of the valve stem 266, provided with a stuffing box where it passes through the casing, is secured a pinion 267. Through guide brackets 268 and 269, extending from the frame 258a, a vertical rack 270 passes with teeth at its lower end in engagement with the pinion 267. The top of the rack is fitted by a pin into the horizontal slot at the end of the lever 257a. The rod 256 is pivoted to the lever 257 by a pin 271 fitting into a horizontal slot in the lever near its fulcrum. Just above this latter slot extending upward is a projection 272.

A vertical rod 273 is inserted top and bottom into separate parts of the frame 258a and is enspiraled by a coiled spring 274 stronger than the coiled spring 259. The spring 274 abuts at its top against a disk and lock nut 275 longitudinally adjustable on the rod 273 and at its bottom against a disk 276, free to move up or down on the rod. Pivoted to the frame 258a at 277 is a bell-crank lever. Extending horizontally from the pivot is a main arm 278 having an armature on its upper side and an eye at its outer extremity through which the rod 273 is inserted so as to bring the disk 276 above the extremity of the arm. The parts are also so located that a lower face on the main arm near its outer extremity is adapted to rest on top of the projection 272. From the pivot 277 an upper arm 279 extends upward, ending in a sloping face. Pivoted at 280 on the frame 258a is a two-arm lever having a right arm 281 with a tooth at its outer end adapted to engage with the upper arm 279 so as to lock the same or so as to rest on its sloping face when the upper arm is unlocked. Extending horizontally from the pivot 280 in an opposite direction is a left arm 282 having an armature on its under side. Secured to the frame 258a is an electro-magnet 283 immediately over the armature of the arm 278; and also so secured immediately under the armature of the arm 282 is an electro-magnet 284.

From the point 41 a wire 285 leads through a point 286 and the electro-magnet 283 to a contact 287. From the point 286 a wire 288 leads through the electro-magnet 284 to a contact 289. From a binding post 290 a wire 291 leads to a point 292 in the wire 42a.

The alternative form of check valve F has a lower casing 294 into which fits the pipe 12, and from which leads the pipe 15 on the left and the pipe having the valve 14 on the right as seen in Fig. 26. Bolted to the top of the lower casing is an upper casing 295, bearing a brass bracket 296; to one side of which on an arm projecting frontward is secured a piece of insulation supporting the contact 287 in front and the contact 289 at the back as seen in Fig. 32. To the opposite side of the bracket is secured the binding post 290. In the passage of the lower casing 294 leading up from the pipe 12 is a narrowed part having an annular passage 297 around its top. In this passage from above fits an upwardly opening conical valve 298 having a downwardly extending projection covering the passage 297 when the valve is seated as shown. Into the extreme top of the upper casing is fitted a cylindrical reciprocating rack 299 having a nut 300 at its lower end. A small relief passage 301 leads from the top of the casing above the rack into the body of the casing. Threaded on to the nut 300 is the upper part of a valve 302 having a hollow valve stem and adapted to shut off the upper part of the casing 295. The stem of the valve 302 has threaded within it a longitudinally adjustable nut 303 against the under side of which within the stem a coiled spring 304 abuts at its top. A headed stud 305 projects through the middle of the bottom of the valve 302 and has its lower end secured to the valve 298. The top of the stud bears against the bottom of the spring 304. The construction of the parts is such that as the valve 298 is lifted by sufficient gas pressure from the pipe 12, it first seats the valve 302 and it next compresses the spring 304 and uncovers the annular passage 297 so that gas is free to pass into the pipe 15. Journaled in the casing 295 is a shaft 306 having a pinion 307 within the casing meshing with the rack 299. The shaft is provided with a stuffing box where it passes from the casing and is journaled at its front end in the bracket 296. Pivoted on the shaft 306 is a double lever having two frontwardly projecting pins 308 and 309 not far apart. Also pivoted in the bracket 296 in front of the shaft 306 is an arm having a weight 310 at its top and another arm 311 at right angles to the first arm and adapted to make instantaneous engagement with the contact 287 as it descends in front of the insulation and with the contact 289 as it ascends back of the insulation. The insulation is beveled as shown in Fig. 33 so that such descent will be in front and the ascent will be in back.

The construction of these parts is such that, when the valve 298 is first lifted, the rack 299 rotates the pinion 307 so that the pin 309 carries the weight 310 past the center of gravity of its pivot so that as it falls to the left, as seen in Fig. 32, it will carry the arm 311 into instantaneous engagement with the contact 287 and then below it. Consequently the circuit is closed for an instant between the wire 285 and the wire 291. When the pressure on the under side of the valve 298 drops in consequence of the cooling of the still casing S, the valve 298 first covers the annular passage 297 and as it is itself seated it unseats the valve 302 into the position as shown. The first part of this latter movement rotates the pinion 307 back to its original position so that the pin 308 will carry the weight 310 past the center of gravity of its pivot so that it will fall back to its original position on the right, so that as it falls it will carry the arm 311 into instantaneous engagement with the contact 289 and then above it as shown in Fig. 32. Consequently the circuit is closed for an instant between the wire 288 and the wire 291.

An alternative form of thermostat T*rr* for the refrigerator R*a* is constructed so that it may be adjusted without lifting the cover. In it the band corresponding to the band 121 is pivoted at the bottom of the thermostat and the arm corresponding to the arm 122 extends above it. These parts and the inclosing casing are within the refrigerator. The rocker corresponding to the rocker 128 and its adjacent parts are in the enlargement above the refrigerator. The lever corresponding to the jawed lever 131 is inverted to correspond to the changed position of the arm engaging it. A thermometer 293 has its reservoir inserted into the refrigerator for the purpose of observation.

In Fig. 26 the automatic circuit breaker B is entirely omitted so that the line 64*a* runs directly to the binding post 73. The only effect of such an omission is that current contines to flow through the electro-magnet 65 and the thermostat T*s* until the temperature in the still casing S drops sufficiently for the contact to be broken between whichever pair of contact wires are in connection across the tube 193. For a small machine such a condition is inconsequential. For a large machine it had better be avoided by the insertion of the circuit breaker B.

In the alternative construction of these latter figures, referring to the valves F and D, as the still casing S begins to be heated, the pressure of the gas in the pipe 12 closes the valve 302 and an instant later opens the valve 298. The only purpose in shutting off the upper part of the casing 295 while the still casing is being heated is to prevent a possible escape of gas through the stuffing box of the shaft 306 while this part of the machine is under the higher pressure caused by the heating. Otherwise it is simpler to attach the rack 299 directly to the valve 298. As the arm 311 makes instantaneous engagement simultaneously with the lifting of the valves 298 and 302, a current passes from the point 41 through the wire 285, the point 286, the electro-magnet 283, the contact 287, the arm 311, the bracket 296, the binding post 290, the wire 291, the point 292 and the wire 42*a* to the source of power.

The instantaneous energization of the electro-magnet 283 lifts the main arm 278. Thereupon the right arm 281 locks the upper arm 279. By this movement of the upper parts the pressure of the gas coming from the pipe 19 is able to force the diaphragm 262 upward if the tension on the under side is greater than the thrust of the spring 259. Suppose the spring is set at 160 lbs. Then if the temperature of the gas in the pipes 15 and 19 has been at 88°, corresponding to a pressure of 162 lbs. as shown by the gage H, the rod 256 is lifted immediately. But if the pressure of the gas in these pipes has been say at 80°, corresponding to a gage pressure of 139 lbs., the rod 256 is not lifted until the temperature of the gas passing from the still casing S through the pipes 15 and 19 slightly exceeds 87°. In either case the lifting of the rod 256 lifts the lever 257*a* and the rack 270. The lifting of the rack rotates the pinion 267 and opens the valve 265 less or more according to the less or greater compression of the spring 259 from a less or greater gas tension on the diaphragm. Water is now flowing into the condenser tank C according to the requirements of the machine.

When the still casing has ceased to be heated through the action of the thermostat T*s* and the pressure in the pipe 12 no longer exceeds the pressure in the pipe 15, the dropping of the valves 298 and 302 sends a current from the point 41, through the wire 285, the point 286, the wire 288, the electro-magnet 284, the contact 289, the arm 311, the bracket 296, the binding post 290, the wire 291, the point 292 and the wire 42*a* as before.

The instantaneous energization of the electro-magnet 284 depresses the left arm 282 and lifts the right arm 281 so as to unlock the upper arm 279. Thereupon the spring 274, reinforcing the spring 259, depresses the rod 256, notwithstanding whatever high pressure there may be on the under side of the diaphragm 262, and also depresses the rack 270 so as to close the valve 265 absolutely. By using a rotary valve, such as the valve 265, less power is required in opening and closing the valve than in case of the gate valve of the valve CW; and there is less likelihood of leakage at the stuffing box.

The alternative structure of the valves F and D has the advantages that no water flows through the condenser tank and rectifier until it is required by the heating of the still casing, that the water is absolutely shut off when the pressure in the still casing no longer exceeds the pressure in the condenser tank, and that no adjustments are necessary with the change of the seasons. It will be noted that the movable parts above the valve 298, with their electric connections, tend to close the valve 265, but that when the pressure below the valve 298 a little exceeds the pressure beyond it, not merely does the valve 265 open but also the extent to which it is open corresponds to the variations of pressure below the valve 298 when above the limit necessary to keep it open, such variations being communicated through the pipes 15 and 19 to the diaphragm 262.

Finally considering the preferred form of Figs. 35 to 38 inclusive: Here the parts that are identically the same as those in the preceding figures are indicated by the same characters; and the parts that have the same functions and are so nearly the same as in the preceding figures as to need no further description or but little description are indicated by the same characters with the addition of a "$b$."

Most of the parts of the machine shown in Figs. 35 and 36, by means of suitable brackets, are bolted to a wooden base 312, which in turn by means of bolts and distance collars 313 is secured to the left side of the refrigerator R$b$, but at a little distance from it, so as to permit of a flow of air between the base and the outside wall of the refrigerator. Similarly most of the parts shown in Figs. 37 and 38 are bolted to a wooden base 314, which, by bolts and distance collars 315, is secured to the right side of the refrigerator so as to provide an intervening air space. Secured to the top and back of the refrigerator is a conduit box 316.

The condensing water, after passing through the valve D, passes through the pipe 31$b$ into the bottom inner pipe of the double pipe condenser casing C$b$, which is of a common type of construction. Emerging at the top from these inner pipes, convoluting upward, the water passes through the pipe 32$b$. The gas expelled from the still casing S$b$, through the analyzer 9$b$, the rectifier 10$b$ and the pipe 15$b$, enters the annular space in the condenser at the top and passing downward is condensed. From the condenser casing the liquefied ammonia passes downward through a short pipe 317, provided with a stop valve 318, into an upright cylindrical receiver 319, whence it passes to the valve E.

The conduit box 316 contains the pipe 32$b$ passing over to the right of the refrigerator R$b$ and the pipe 15$b$ coming from the same direction. This box also contains the inclosed wiring passing from and to the same side of the refrigerator. The pipe 26$b$, leading to the valve SW, passes underneath the refrigerator and thence up the right side. The convoluted part of the expansion coil K$b$ is placed in a brine tank 320 supported in the upper part of the refrigerator.

The pipe 32$b$ leads the condensing water, somewhat warmed, into the top or into the bottom, as shown, of the inner pipe of the double pipe rectifier 10$b$. This rectifier is constructed similarly to the condenser casing C$b$, except that the returns of the piping are at angles of say 15 or 20° so as to permit of the moisture, entrained upward with the gas, dripping downward through the annular passages into the analyzer 9$b$. The rectifier 10$b$, having an interior cooling water passage and an annular gas passage outside of the water passage, so as to permit the ascending dense gas to be cooled on the inside by water, and on the outside by the atmosphere and to cause any water entrained upward from the still casing to drain back, is also more commonly designated as a dehydrater.

The inclosed electric wiring, coming from and returning to the hand switch 45$b$, mounted on the slate switch board 321, is carried mostly along the back part of the bases 312 and 314. Dividing from the wire 36$b$ the wire 46$b$ leads to the sub-frame 88; thence the wire 47$b$ leads to the heater 1$b$; and thence the wire 51$b$ returns to the switch through the wire 42$b$. Also dividing from the wire 36$b$ the wire 59$b$ leads through the point 60$b$ and the electro-magnet 61 to the left terminal of the thermostat T$rr$. From the point 60$b$ the wire 76$b$ leads through the electro-magnet 77 to the right terminal of this thermostat. Dividing from the wire 59$b$ the wire 55$b$ leads through the electro-magnet 56 to the left terminal of the same thermostat. Also dividing from the wire 59$b$ the wire 79$b$ leads through the electro-magnet 80 to the right terminal of the same thermostat. The center terminal of this thermostat connects with the wire 42$b$. Dividing from the wire 36$b$ the wire 64$b$ leads through the electro-magnet 65 and the upper part of the circuit breaker B to the wire 72$b$. Dividing from the wire 64$b$ the wire 67$b$ leads through the solenoid 68 to the wire 72$b$. This latter wire leads to the thermostat T$s$. From this latter thermostat the wire 75b connects with the wire 51b. Dividing from the wire 36b wires 322 and 323, apparently as one wire, lead to the check valve F at its contacts 287 and 289 respectively; and from these contacts they lead to a point 324. From the point 324 the wire 322 leads through the electro-magnet 283 to a point 325. From the point 324 the wire 323 leads through the electro-magnet 284 to the point 325. From the point 325 a wire 326 leads to the wire 51b.

As these latter figures embrace all the elements previously shown and described, the operation of this preferred machine causes each part to perform its appropriate function as previously described. And while the wiring leading to and from the valves F and D is arranged slightly differently, the operation is the same.

It is evident that, while in one sense, a structure, such as the tank C and the pipe 18 of Fig. 1, constitute a condenser, yet, in a larger sense, the term condenser includes all the conduits through which the refrigerant passes, and the vessels in which it is contained, between the valve 13 and the valve 232 of the valve structure E, and also includes the associated water conduits leading from the valve CW. So in Fig. 26 and in Figs. 35 to 38 inclusive, the term condenser includes all the conduits through which the refrigerant passes, and the vessels in which it is contained, between the valve 298 if the valve structure F and the valve 232 of the valve structure E, and also includes the associated water conduits leading from the valve D. The broad turn evaporator comprehends all of the conduits through which the refrigerant passes between the valve 232, of the valve structure E, and the valve 5. The term still comprehends, in Figs. 1 and 26, not merely the casing S, but in addition includes all the conduits through which the refrigerant passes, and the vessels in which it is contained, between the valve 5 and the valve 13, of Fig. 1, and between the valve 5 and the valve 298 of the valve structure F of Fig. 26, together with the water pipe 34. In Figs. 35 to 38 inclusive, the term still comprehends, not merely the casing Sb, but in addition includes all the conduits through which the refrigerant passes, and the vessels in which it is contained, between the valve 5 and the valve 298, of the valve structure F (see Figs. 37 and 38), together with the water pipe 32b and the water pipe leading therefrom through the rectifier 10b. The term condenser casing, as applied to Figs. 35 to 38 inclusive, excludes the gas conduit 15b. The term thermostat broadly includes all the connections whereby it operates.

In the operation of the still, it will be noted that the heating period of the still and its absorbing and cooling period are not in alternation with each other; but that there is interposed between these two periods a third period of inaction, to permit of the cooling down of the still. This is necessary, if the still is to be heated to anything like 300°. For, if, immediately upon the termination of the heating, water were turned on to cool the still, at any temperature above 212°, it would flash into steam, and, at any temperature in excess of 150°, it would injure the metal.

In order that the ammoniacal solution in the still shall be reduced to a predetermined weakness, at the end of the heating, it is essential that the final temperature and head pressure shall both be predetermined. Both factors are provided for in my construction, it being considered that 300° is the most economical final temperature and that 160 pounds is the head pressure best adapted for average conditions with this machine.

Strictly speaking, the machine might be operated without any cooling water for the still or for the condenser. But in the former case, the solution in the still would soon heat up and would tend to prevent an absorption of the expanded refrigerant entering from the evaporator. In the latter case, if the still were allowed to heat up to 300°, or thereabout, a very high head or condenser pressure would develop, even though the radiation from the condenser should be sufficient to permit the liquefaction of the ammonia gas expelled from the still.

By interposing the check valves 13 and 298 at the tops of their respective rectifiers, or dehydraters, there is at all times a free passage for the back flow of any water entrained upward from the still casing.

What I have invented and what I desire to have protected by Letters Patent is expressed in claims as follows: I claim:

1. In combination a condenser, an evaporator leading from said condenser through a place to be refrigerated, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, a thermostat operating at a low temperature limit in said place to close said valves and subsequently operating to open the valves, and means heating said still to a predetermined limit when said valves are closed.

2. In combination a condenser, an evaporator leading from said condenser through a place to be refrigerated, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, heating means for heating said still, a thermostat controlled by the temperature in said place and operating at a low temperature limit to close said valves and to start the operation of said heating means and at a high temperature limit to open the valves, and means terminating such heating before the opening of said valves.

3. In combination a condenser, an evaporator leading from said condenser through a place to be refrigerated, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, a thermostat operating at a low temperature limit in said place to close said valves and subsequently operating to open the valves, and means heating said still when said valves are closed until the absorbent and the absorbed refrigerant therewith have been reduced to a predetermined weakness.

4. In combination a condenser, an evaporator leading from said condenser through a place to be refrigerated, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, heating means for heating said still, a thermostat controlled by the temperature in said place, and operating at a low temperature limit to close said valves and to start the operation of said heating means and at a high temperature limit to open the valves, and means terminating such heating while said valves are closed and when the absorbent and the absorbed refrigerant therewith have been reduced to a predetermined weakness.

5. In combination a condenser, an evaporator leading from said condenser, a still adapted to contain an absorbent and leading from said evaporator into said condenser, means for preventing a back flow of refrigerant from said condenser into said still and from said still into said evaporator, a feed valve controlling the inlet end of said evaporator, a thermostat at a low temperature limit controlled by the temperature about said evaporator and operative at a high temperature limit to open said valve and at such low limit to close it, means permitting a flow of cooling water to said still exclusively in its absorption period, and means operative for heating at intervals said still to a predetermined limit.

6. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, a thermostat at a low temperature limit controlled by the temperature about said evaporator and operative at a high temperature limit to open said valves and at such low limit to close them, and means operative for heating at intervals said still to a predetermined limit.

7. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, a thermostat at a low temperature limit controlled by the temperature about said evaporator and operative at a high temperature limit to open said valves and at such low limit to close them, means for limiting the amount of flow through said passage when said water valve is so opened, and means operative for heating at intervals said still to a predetermined limit.

8. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, a thermostat at a low temperature limit controlled by the temperature about said evaporator and operative at a high temperature limit to open said valves and at such low limit to close them, means for regulating the extent to which said feed valve may be so opened, means for limiting the amount of flow through said passage when said water valve is so opened, and means operative for heating at intervals said still to a predetermined limit.

9. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, a thermostat at a low temperature limit controlled by the temperature about said evaporator and operative at a high temperature limit to open said valves and at such low limit to close them, and means operative for heating at intervals said still to a high temperature limit.

10. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, a thermostat at a low temperature limit controlled by the temperature about said evaporator and operative at a high temperature limit to open said valves and at such low limit to close them, means for limiting the amount of flow through said passage when said water valve is so opened, and means operative for heating at intervals said still to a high temperature limit.

11. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, a thermostat at a low temperature limit controlled by the temperature about said evaporator and operative at a high temperature limit to open said valves and at such low limit to close them, means for regulating the extent to which said feed valve may be so opened, means for limiting the amount of flow through said passage when said water valve is so opened, and means operative for heating at intervals said still to a high temperature limit.

12. In combination a condenser, an evaporator leading from said condenser, a still adapted to contain an absorbent and leading from said evaporator into said condenser, means for preventing a back flow of refrigerant from said condenser into said still and from said still into said evaporator, a feed valve controlling the inlet end of said evaporator, heating means for heating said still to a predetermined limit, a thermostat at a low temperature limit controlled by the temperature about said evaporator and operative at a high temperature limit to open said valve and at such low limit to close it and to start the operation of said heating means, and means for permitting a flow of cooling water to said still in its time of absorbing.

13. In combination a condenser, an evaporator leading from said condenser, a still adapted to contain an absorbent and leading from said evaporator into said condenser, means for preventing a back flow of refrigerant from said condenser into said still and from said still into said evaporator, a feed valve controlling the inlet end of said evaporator, heating means for heating said still to a predetermined limit, a thermostat at a low temperature limit controlled by the temperature about said evaporator and operative at a high temperature limit to open said valve and at such low limit to close it and to start the operation of said heating means, means for regulating the extent to which said valve may be so opened, and means for permitting a flow of cooling water to said still in its time of absorbing.

14. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, heating means for heating said still to a predetermined limit, and a thermostat at a low temperature limit controlled by the temperature about said evaporator and operative at a high temperature limit to open said valves and at such low limit to close them and to start the operation of said heating means.

15. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, heating means for heating said still to a predetermined limit, a thermostat at a low temperature limit controlled by the temperature about said evaporator and operative at a high temperature limit to open said valves and at such low limit to close them and to start the operation of said heating means, and means for limiting the amount of flow through said passage when said water valve is so opened.

16. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, heating means for heating said still to a predetermined limit, a thermostat at a low temperature limit controlled by the temperature about said evaporator and operative at a high temperature limit to open said valves and at such low limit to close them and to start the operation of said heating means, means for regulating the extent to which said feed valve may be so opened, and means for limiting the amount of flow through said passage when said water valve is so opened.

17. In combination a condenser, an evaporator leading from said condenser, a still adapted to contain an absorbent and leading from said evaporator into said condenser, means for preventing a back flow of refrigerant from said condenser into said still and from said still into said evaporator, a feed valve controlling the inlet end of said evaporator, heating means for heating said still to a high temperature limit, a thermostat at a low temperature limit controlled by the temperature about said evaporator and operative at a high temperature limit to open said valve and at such low limit to close it and to start the operation of said heating means, and means for permitting a flow of cooling water to said still in its time of absorbing.

18. In combination a condenser, an evaporator leading from said condenser, a still adapted to contain an absorbent and leading from said evaporator into said condenser, means for preventing a back flow of refrigerant from said condenser into said still and from said still into said evaporator, a feed valve controlling the inlet end of said evaporator, heating means for heating said still to a high temperature limit, a thermostat at a low temperature limit controlled by the temperature about said evaporator and operative at a high temperature limit to open said valve and at such low limit to close it and to start the operation of said heating means, means for regulating the extent to which said valve may be so opened, and means for permitting a flow of cooling water to said still in its time of absorbing.

19. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, heating means for heating said still to a high temperature limit, and a thermostat at a low temperature limit controlled by the temperature about said evaporator and operative at a high temperature limit to open said valves and at such low limit to close them and to start the operation of said heating means.

20. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, heating means for heating said still to a high temperature limit, a thermostat at a low temperature limit controlled by the temperature about said evaporator and operative at a high temperature limit to open said valves and at such low limit to close them and to start the operation of said heating means, and means for limiting the amount of flow through said passage when said water valve is so opened.

21. In combination a condenser, an evaporator leading from said condenser, a still having a cooling water passage, adapted to contain an absorbent and leading from said evaporator into said condenser, means for preventing a back flow of refrigerant from said condenser into said still and from said still into said evaporator, a feed valve controlling the inlet end of said evaporator, a water valve controlling said passage, heating means for heating said still to a high temperature limit, a thermostat at a low temperature limit controlled by the temperature about said evaporator and operative at a high temperature limit to open said valves and at such low limit to close them and to start the operation of said heating means, means for regulating the extent to which said feed valve may be so opened, and means for limiting the amount of flow through said passage when said water valve is so opened.

22. In combination a condenser casing, an evaporator leading from said casing, a still casing adapted to contain an absorbent, leading from said evaporator and having an outlet, means for regulating the flow of refrigerant from said condenser casing into said evaporator, its expansion within the evaporator and its absorption in said still casing, means for heating at intervals said still casing, an analyzer leading upward from said outlet and having baffle plates arranged transversely to the pathway of the ascending gas, a dehydrater leading upward from said analyzer, a gas pipe leading from said dehydrater into said condenser casing, means for preventing a back flow of refrigerant from said still casing into said evaporator and from said condenser casing into said still casing, and means for permitting a flow of cooling water to said condenser casing and to said dehydrater in the time of such heating.

23. In combination a condenser casing, an evaporator leading from said casing, a still casing adapted to contain an absorbent, leading from said evaporator and having an outlet, means for regulating the flow of refrigerant from said condenser casing into said evaporator, its expansion within the evaporator and its absorption in said still casing, means for preventing a back flow of refrigerant from said still casing into said evaporator, means for heating at intervals said still casing, an analyzer leading upward from said outlet and having baffle plates arranged transversely to the pathway of the ascending gas, a dehydrater leading upward from said analyzer, a gas pipe leading from said dehydrater into said condenser casing, a check valve interposed between said dehydrater and said pipe, and means for permitting a flow of cooling water to said condenser casing and to said dehydrater in the time of such heating.

24. In combination a still casing adapted to contain an absorbent and having a gas outlet from its top, a gas inlet conduit leading into said casing and terminating in its lower part, a cooling water pipe entering said casing, coiling downward therein and emerging from its lower part, means for heating at intervals said casing, a valve controlling the inlet end of said pipe, and means for preventing an opening of said valve during the heating of said casing but for subsequently permitting such opening until the time of the next such heating.

25. In combination a still casing adapted to contain an absorbent and having a gas outlet from its top, a gas inlet conduit leading into said casing and terminating in its lower part, a cooling water pipe entering said casing, coiling downward therein and emerging from its lower part, means for heating at intervals said casing, a valve controlling the inlet end of said pipe, means for limiting the amount of flow through said pipe when said valve is open, and means for preventing an opening of said valve during the heating of said casing but for subsequently permitting such opening until the time of the next such heating.

26. In combination a still casing adapted to contain an absorbent and having a gas outlet from its top, a gas inlet conduit leading into said casing and terminating in its lower part, a cooling water pipe entering said casing, coiling downward therein and emerging from its lower part, means for heating at intervals said casing, a valve controlling the inlet end of said pipe, means for always permitting an outflow from the outlet end of said pipe but adjustable so as to limit the amount of such outflow when said valve is open, and means for preventing an opening of said valve during the heating of said casing but for subsequently permitting such opening until the time of the next such heating.

27. In combination a still casing adapted to contain an absorbent and having a gas outlet from its top, a gas inlet conduit leading into said casing and terminating in its lower part, a cooling water pipe entering said casing, coiling downward therein and emerging from its lower part, means operative for heating at intervals said casing to a predetermined limit, a valve controlling the inlet end of said pipe, and means operative to lock closed said valve at the beginning of such a heating and to unlock and to open it after the termination of the heating.

28. In combination a still casing adapted to contain an absorbent and having a gas outlet from its top, a gas inlet conduit leading into said casing and terminating in its lower part, a cooling water pipe entering said casing, coiling downward therein and emerging from its lower part, means operative for heating at intervals said casing to a predetermined limit, a valve controlling the inlet end of said pipe, means for limiting the amount of flow through said pipe when said valve is open, and means operative to lock closed said valve at the beginning of such a heating and to unlock and to open it after the termination of the heating.

29. In combination a still casing adapted to contain an absorbent and having a gas outlet from its top, a gas inlet conduit leading into said casing and terminating in its lower part, a cooling water pipe entering said casing, coiling downward therein and emerging from its lower part, means operative for heating at intervals said casing to a predetermined limit, a valve controlling the inlet end of said pipe, means for always permitting an outflow from the outlet end of said pipe but adjustable so as to limit the amount of such outflow when said valve is open, and means operative to lock closed said valve at the beginning of such a heating and to unlock and to open it after the termination of the heating.

30. In combination a still casing adapted to contain an absorbent and having a gas outlet from its top, a gas inlet conduit leading into said casing and terminating in its lower part, a cooling water pipe entering said casing, coiling downward therein and emerging from its lower part, means operative for heating at intervals said casing to a high temperature limit, a valve controlling the inlet end of said pipe, and means operative to lock closed said valve at the beginning of such a heating and to unlock and to open it after the termination of the heating.

31. In combination a still casing adapted to contain an absorbent and having a gas outlet from its top, a gas inlet conduit leading into said casing and terminating in its lower part, a cooling water pipe entering said casing, coiling downward therein and emerging from its lower part, means operative for heating at intervals said casing to a high temperature limit, a valve controlling the inlet end of said pipe, means for limiting the amount of flow through said pipe when said valve is open, and means operative to lock closed said valve at the beginning of such a heating and to unlock and to open it after the termination of the heating.

32. In combination a still casing adapted to contain an absorbent and having a gas outlet from its top, a gas inlet conduit leading into said casing and terminating in its lower part, a cooling water pipe entering said casing, coiling downward therein and emerging from its lower part, means operative for heating at intervals said casing to a high temperature limit, a valve controlling the inlet end of said pipe, means for always permitting an outflow from the outlet end of said pipe but adjustable so as to limit the amount of such outflow when said valve is open, and means operative to lock closed said valve at the beginning of such a heating and to unlock and open it after the termination of the heating.

GEORGE P. CARROLL.

Witnesses:
V. R. C. GIDDINGS,
FRANK J. HUGHES.